United States Patent [19]
Mita et al.

[11] Patent Number: 5,680,486
[45] Date of Patent: Oct. 21, 1997

[54] IMAGE PROCESSING APPARATUS

[75] Inventors: Yoshinobu Mita, Kawasaki; Naoto Kawamura; Miyuki Enokida, both of Yokohama; Yoshihiro Ishida, Kawasaki, all of Japan

[73] Assignee: Canon Kabushiki Kaisha, Tokyo, Japan

[21] Appl. No.: 236,151

[22] Filed: May 2, 1994

Related U.S. Application Data

[63] Continuation of Ser. No. 86,368, Jul. 6, 1993, abandoned, which is a continuation of Ser. No. 729,366, Jul. 12, 1991, abandoned, which is a continuation of Ser. No. 501,429, Mar. 22, 1990, Pat. No. 5,060,280, which is a continuation of Ser. No. 102,581, Sep. 29, 1987, abandoned.

[30] Foreign Application Priority Data

Sep. 30, 1986 [JP] Japan ................... 61-230012
Jan. 26, 1987 [JP] Japan ................... 62-014267

[51] Int. Cl.$^6$ ................................................. G06K 9/20
[52] U.S. Cl. .................... 382/282; 358/453; 382/299
[58] Field of Search ....................... 382/44, 33, 48, 382/49, 54, 56, 289, 299, 239, 240, 282, 284, 214; 358/450, 453; 345/191, 201

[56] References Cited

U.S. PATENT DOCUMENTS

| | | | |
|---|---|---|---|
| 3,921,135 | 11/1975 | Komaru et al. | 382/240 |
| 3,976,982 | 8/1976 | Eiselen | 382/44 |
| 4,434,503 | 2/1984 | Tanaka et al. | 382/48 |
| 4,439,783 | 3/1984 | Nishikawa | 358/183 |
| 4,528,561 | 7/1985 | Kitamura | 340/721 |
| 4,567,515 | 1/1986 | Schumacher | 382/34 |
| 4,602,286 | 7/1986 | Kellar et al. | 358/183 |
| 4,684,936 | 8/1987 | Brown et al. | 340/721 |
| 4,742,399 | 5/1988 | Kitamura | 382/299 |
| 4,750,212 | 6/1988 | Yokomizo | 382/48 |
| 4,777,531 | 10/1988 | Hakamada et al. | 358/183 |
| 4,831,659 | 5/1989 | Miyaoka et al. | 382/240 |
| 4,942,479 | 7/1990 | Kanno | 358/453 |
| 5,060,280 | 10/1991 | Mita et al. | 382/284 |

*Primary Examiner*—Yon J. Couso
*Attorney, Agent, or Firm*—Fitzpatrick, Cella, Harper & Scinto

[57] ABSTRACT

An image processor includes an image memory which stores compressed and coded image data representing an image, the compressed and coded image data includes first data representing the image with a low resolution and second data representing the image with a high resolution. A generating unit generates image data of the low resolution and image data of the high resolution, by decoding the compressed and coded image data stored in the image memory. Area data is provided representing a partial area of the image, the area data including first area data representing the partial area with the low resolution and second area data representing the partial area with the high resolution. A first processor processes the image data of the low resolution generated by the generating unit in accordance with the provided first area data of the low resolution. A second processor processes the image data of the high resolution generated by the generating unit in accordance with the provided second area data and prints an image on the basis of the processed image data of the high resolution.

16 Claims, 21 Drawing Sheets

FIG. 11
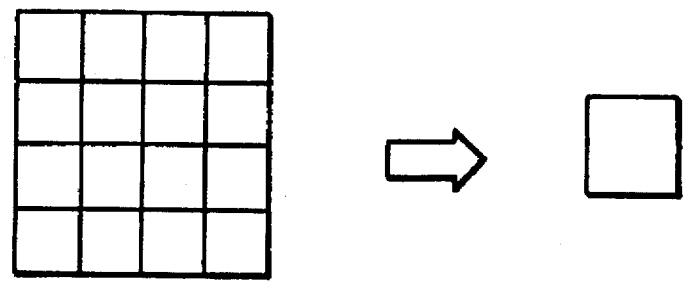
FIG. 12
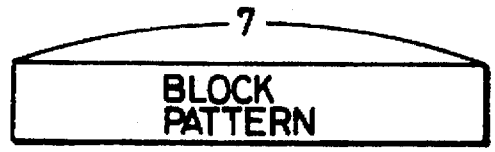
FIG. 13
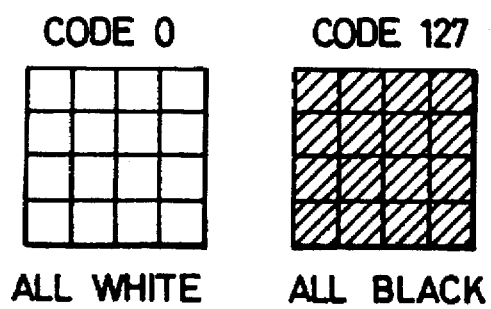
FIG. 14A
CODE 0          CODE 127
ALL WHITE       ALL BLACK

FIG. 14B-2

CODE 37   CODE 38   CODE 39   T162°
CODE 40   CODE 41   CODE 42   $\overline{T162°}$
CODE 43   CODE 44   CODE 45   T72°
CODE 46   CODE 47   CODE 48   $\overline{T72°}$
CODE 49   CODE 50   CODE 51   T108°
CODE 52   CODE 53   CODE 54   $\overline{T108°}$
CODE 55   CODE 56   CODE 57   T18°
CODE 58   CODE 59   CODE 60   $\overline{T18°}$

FIG. 14B-4

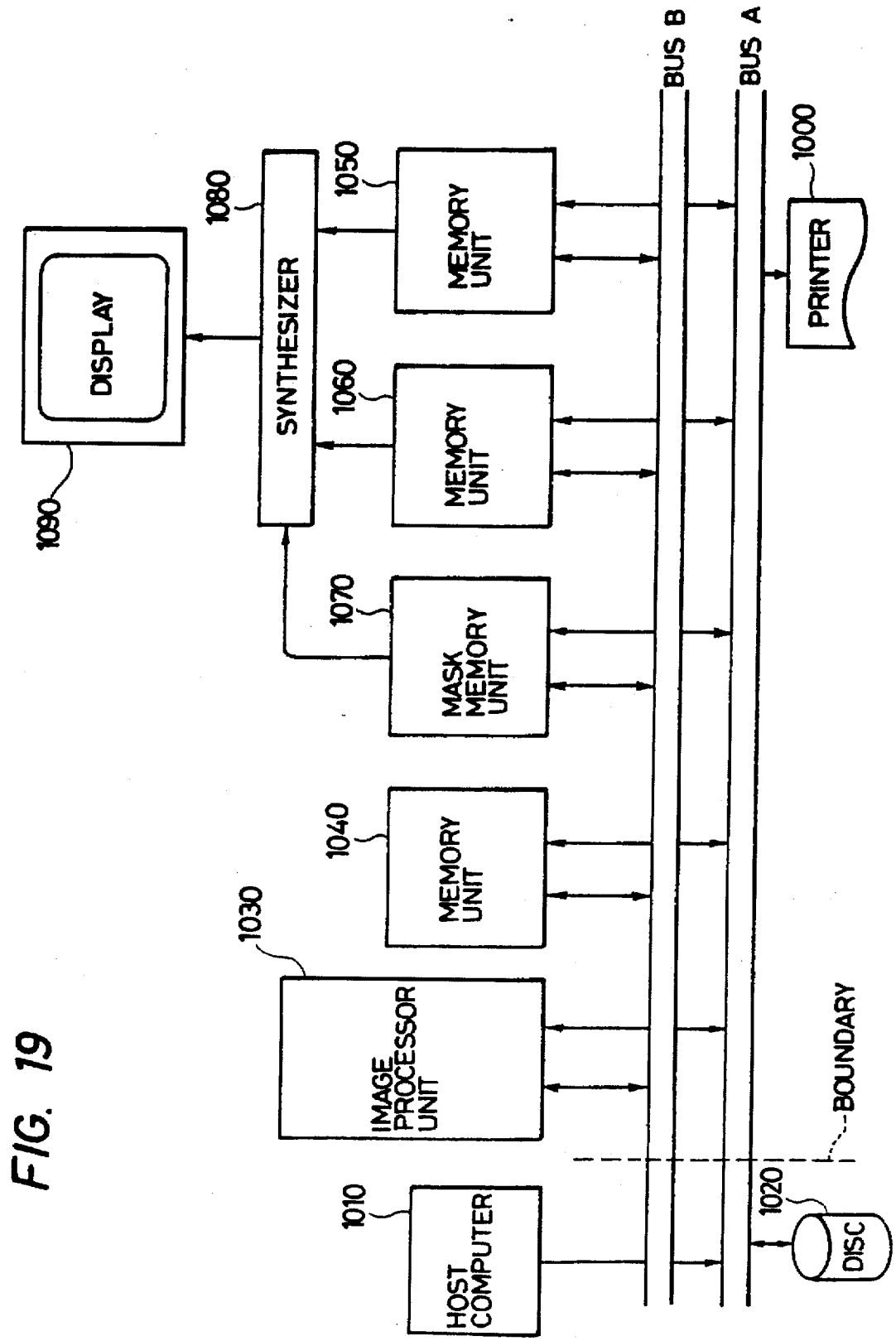

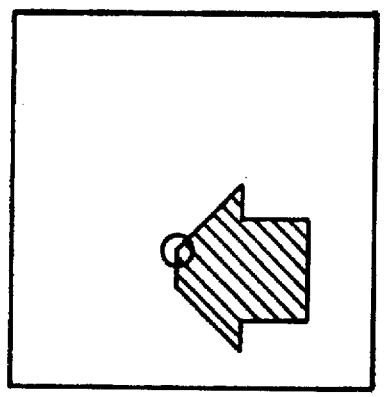
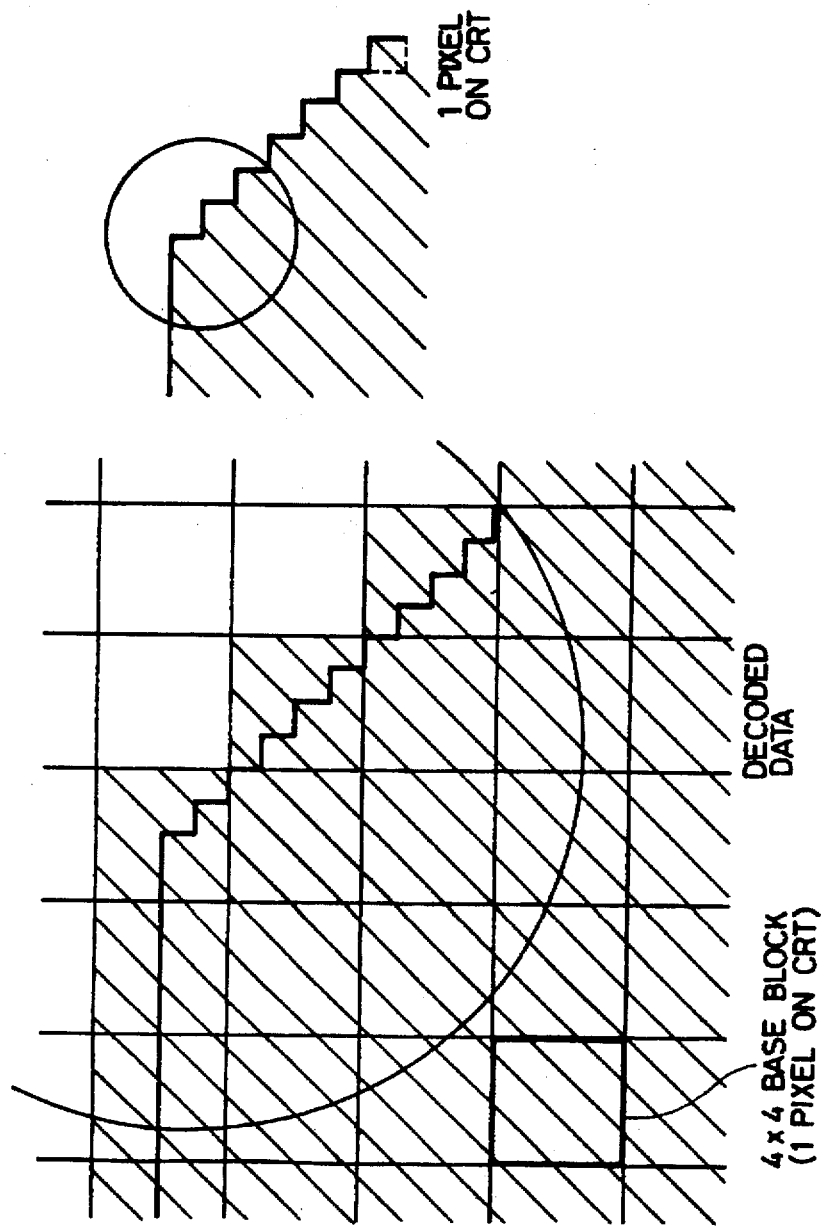

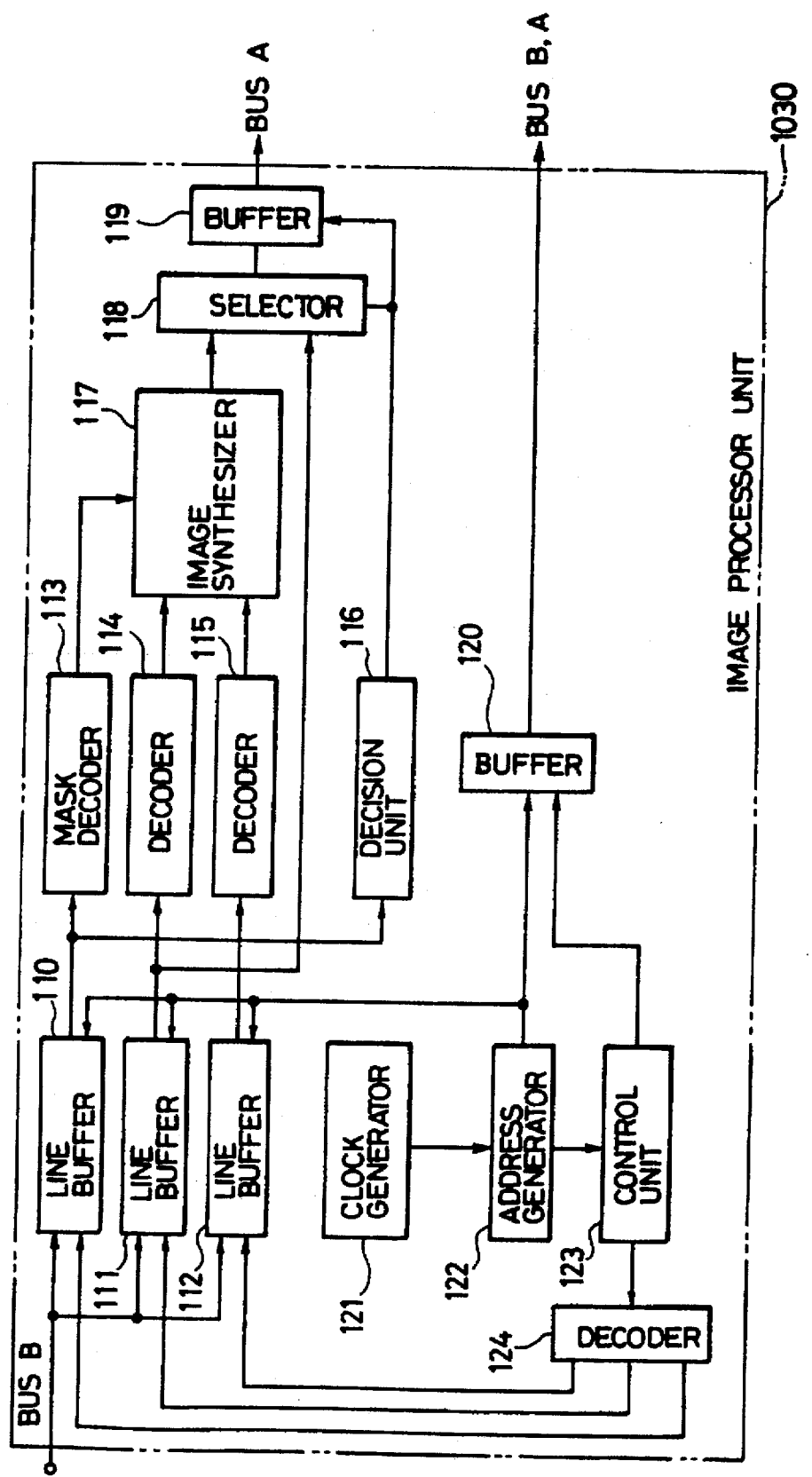

IMAGE PROCESSING APPARATUS

This application is a continuation of application Ser. No. 08/086,368 filed Jul. 6, 1993, now abandoned, which was a continuation of application Ser. No. 07/729,366, filed Jul. 12, 1991 now abandoned, which was a continuation of application Ser. No. 07/501,429, filed Mar. 22, 1990 now U.S. Pat. No. 5,060,280, which was a continuation of application Ser. No. 07/102,581, filed Sep. 29, 1987 now abandoned.

BACKGROUND OF THE INVENTION

1. Field of the Invention

The present invention relates to an image processing apparatus and, more particularly, to an image processing apparatus for performing an image editing process to cut out a part of an image or to synthesize a plurality of images.

2. Related Background Art

In general, when an image editing and the like are performed in such a kind of apparatus, a case where a part of the image data is masked and cut out and the cut-out image is output to a display frequently occurs.

In such a case, a cut-out shape is not limited to an area which is surrounded by geometrical line segments such as simple square, rectangle, regular polygon, or the like but it is desirable that an image can be cut out by a curved area. As a method of cutting out an image in a curved area, there has conventionally frequently been used a method whereby a bit map memory which is used only to cut out (mask) an image is prepared and it is decided on the basis of the bit data in the memory whether the data is cut out or abandoned.

For example, in the case of masking the image data on the basis of the data from the masking bit map memory, only the data in a desired area is extracted from a single image and the resultant data is written into a memory on the destination side.

The applicant of the present application has already proposed such a mask processing method in U.S. patent application Ser. No. 886,222 filed on Jul. 16, 1986 now abandoned and U.S. patent application Ser. No. 940,395 filed on Dec. 11, 1986 now abandoned.

On the other hand, hitherto, to synthesize images stored in two memories, there has been used a method whereby only the image in the necessary portion in the image to be synthesized is cut out and synthesized to another image.

In this case, as shown in FIG. 24, an example in which the portion of the image surrounded by a broken line is synthesized to a ground image to thereby produce a synthesized image can be mentioned. As a practical processing procedure, the image in the portion surrounded by a broken line is synthesized to the ground image on the basis of the position information at points A, B, and the like which indicate the area (hereinafter, referred to as a mask) to cut out the image to be synthesized.

However, although no problem occurs in the case where the shape of the mask is square or rectangular as in the foregoing example, as the shape of mask becomes complicated, an amount of position data to indicate the shape of the mask increases and in order to perform the processes between two memory frames by a CPU or the like, its algorithm increase extremely complicated.

On the other hand, there is considered a method whereby an image is divided into a plurality of images within a range which can be displayed and these images are synthesized by the foregoing method. But, this method is attended by the inconvenience that the operator cannot know the whole image.

In addition, since the printing output accuracy must be made high and the mask shape must be also made smooth, the capacity of the image memory and the capacity of the mask memory also increase extremely. Thus, there is a drawback that the cost and size of the system increase.

Further, since the resolution of the display is obviously lower than that of the printer output, it is also necessary to match the image memory with the display apparatus and printer.

SUMMARY OF THE INVENTION

It is an object of the present invention to provide an image processing apparatus which can solve the foregoing problems.

Another object of the invention is to provide an image processing apparatus which can reduce as small as possible the capacity of the mask memory to cut out or synthesize an image.

Explaining further in detail, according to one aspect of the invention is provided, an image processing apparatus comprising: an image memory to store image data; coding means for dividing the mask data to take out a desired area of the image data stored in the image memory into a plurality of fine data each having a size of n×m and coding them; a mask memory to store each mask code which was coded; decoding means for decoding the mask codes stored in the mask memory; selecting means for selectively extracting the pixel data in the image data stored in the image memory on the basis of the decoded mask pattern; and output means for outputting the selected pixel data to a predetermined output apparatus.

With such a constitution, after the mask code which had been coded by the coding means was stored into the mask memory, the image data stored in the image memory is extracted by the selecting means on the basis of the mask pattern which was decoded by the decoding means, and the extracted image data is output to the predetermined output apparatus by the output means, so that the capacity of the mask memory can be reduced.

Still another object of the invention is to provide an image processing apparatus having means for individually storing the mask data into an output apparatus having a low resolution and into an output apparatus having a high resolution.

Still another object of the invention is to provide an image processing apparatus which can synthesize images by a simple constitution while displaying the whole synthesized image larger than the display screen.

Explaining further in detail, still another aspect of the invention is achieved by providing an image processing apparatus comprising: image memory means for developing image data into shape data and luminance data on a pixel unit basis of n×m and storing them; mask data memory means for developing mask data of a partial image to extract the first image data in the image memory means into a shape data and a mask control data to decide whether the masking processing is performed or not on a dot unit basis of n×m and for storing those data; selecting means for selecting either one of the luminance data of the first and second image data in accordance with the mask control data when the partial image of the first image data is synthesized to the second image data stored in the image memory means and the synthesized image is displayed; and display means for displaying onto the display screen on the basis of the luminance data selected.

With such a constitution, when the partial image to be extracted from the first image data stored in the image memory means is synthesized to the second image data and the synthesized image is displayed, the luminance data of either one of the first and second image data is selected by the selecting means on the basis of the mask control data stored in the mask data memory means and the selected luminance data is displayed by the display means.

The above and other objects and features of the present invention will become apparent from the following detailed description and the appended claims with reference to the accompanying drawings.

BRIEF DESCRIPTION OF THE DRAWINGS

FIG. 11 is a diagram for explaining the compression of mask data;

FIG. 12 is a diagram showing an example of a block of a mask pattern;

FIG. 13 is a diagram showing the compressed mask data;

FIGS. 14A, 14B-1, 14B-2, 14B-3, and 14B-4 are diagrams showing the relations between the mask patterns and the codes;

FIG. 19 is a block constitutional diagram of an image processing apparatus in the second embodiment of the invention;

FIGS. 21A, 21B, and 21C are diagrams for explaining the mask process in the embodiment;

FIG. 23 is a block diagram of an image processor unit;

DETAILED DESCRIPTION OF THE PREFERRED EMBODIMENTS

The first embodiment according to the present invention will be described in detail hereinbelow with reference to the drawings.

Description of the Fundamental Constitution

Figure 1:
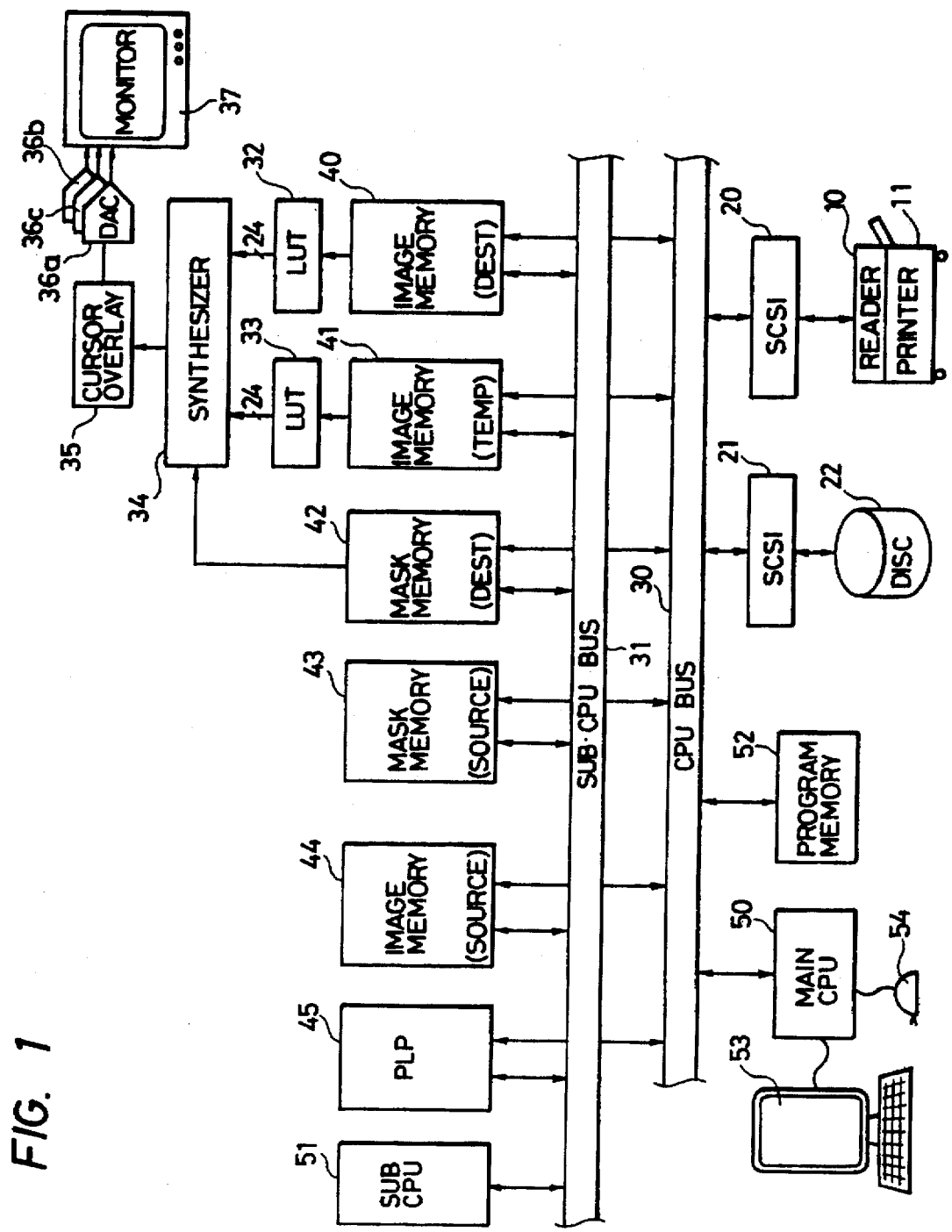
FIG. 1 is a whole constitutional diagram of an image editing apparatus in the first embodiment of the present invention.

A constitution of an image editing apparatus in the first embodiment of the invention is shown in FIG. 1 and an outline of the operation will be first described.

Image data read out by a reader 10 is compressed by a compressor (not shown because it is included in the reader), which will be explained hereinafter. The compressed data is stored into an image memory 40 or 41 through a general SCSI (Small Computer System Interface) 20. The contents of the image memories 40 and 41 are color converted by look-up tables (hereinafter, simply referred to as LUT) 32 and 33 and thereafter, they are returned to analog R, G, and B signals by D/A converters 36a, 36b, and 36c and displayed by a monitor display 37.

At this time, to enhance the editing function, the image memory has the capacity corresponding to three memories: i.e., an image memory 44 for sources, the image memory 41 for an intermediate buffer, and the image memory 40 for destination. Each memory is selectively connected to two buses (CPU bus 30 and sub CPU bus 31). This selection is performed in response to a command from a main CPU 50 through a control bus existing in the CPU bus 30. Namely, the respective image memories 40, 41, and 44 are always connected one by one to the CPU bus 30 and sub CPU bus 31 by a command from the main CPU 50. Two images in the image memories 40 and 41 are synthesized on the basis of data stored in a mask memory 42. The synthesized image is displayed by the monitor display 37. Namely, the data in the mask memory 42 is read out synchronously with the image data in the image memories 40 and 41 at the video rate. It is determined on the basis of the content of the mask memory 42 whether the content of the image memory 40 is displayed or the content of the image memory 41 is displayed. Therefore, by selecting the readout data from the two image memories by a synthesizer 34 on the basis of the output of the mask memory 42, these two images are synthesized and displayed on the monitor display 37.

Description of the Compression of Image Data

The compression of image data will now be explained.

Figure 2:
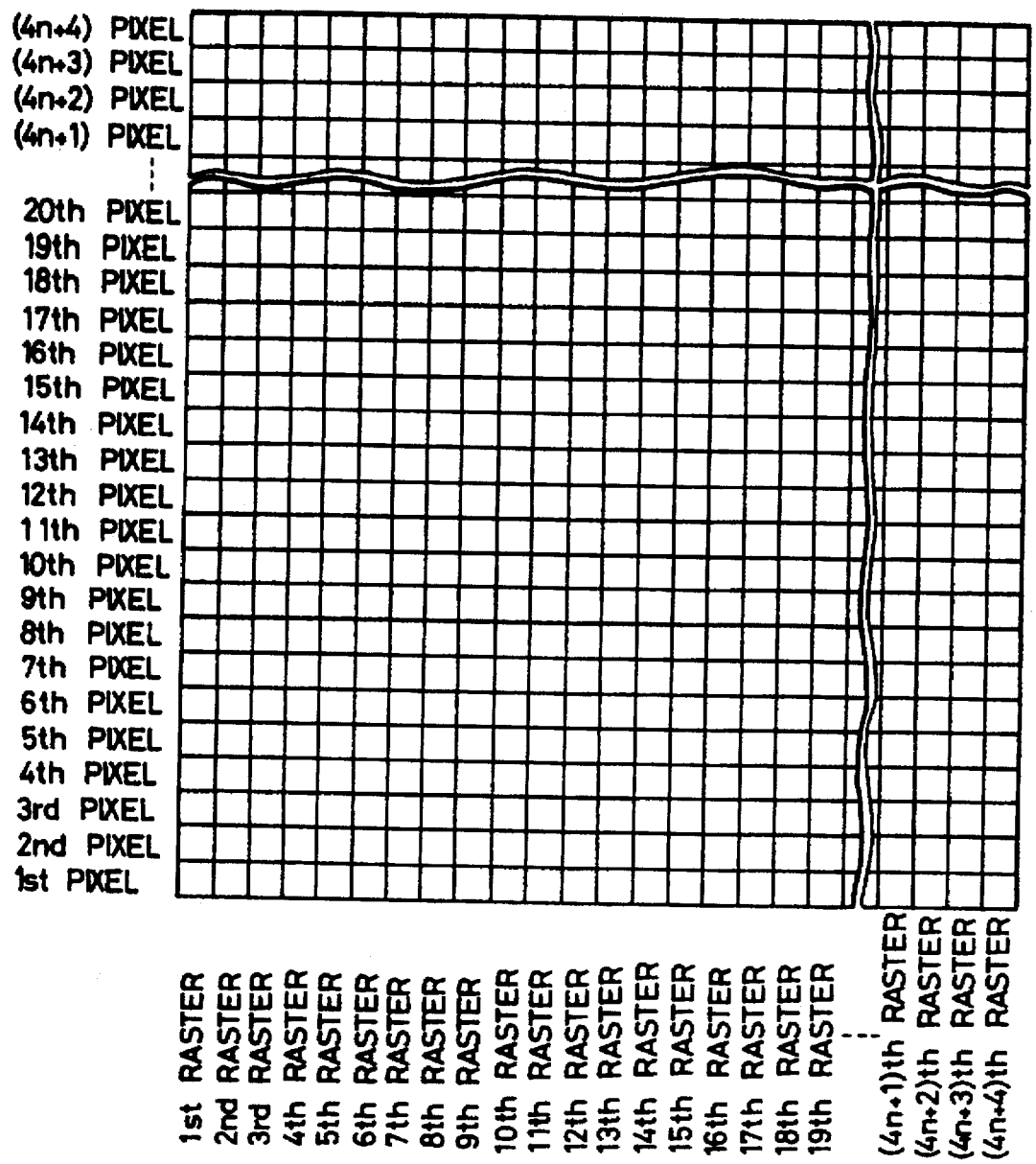
FIG. 2 is a diagram showing an original image as a constitution on a pixel unit basis.
Figure 3:
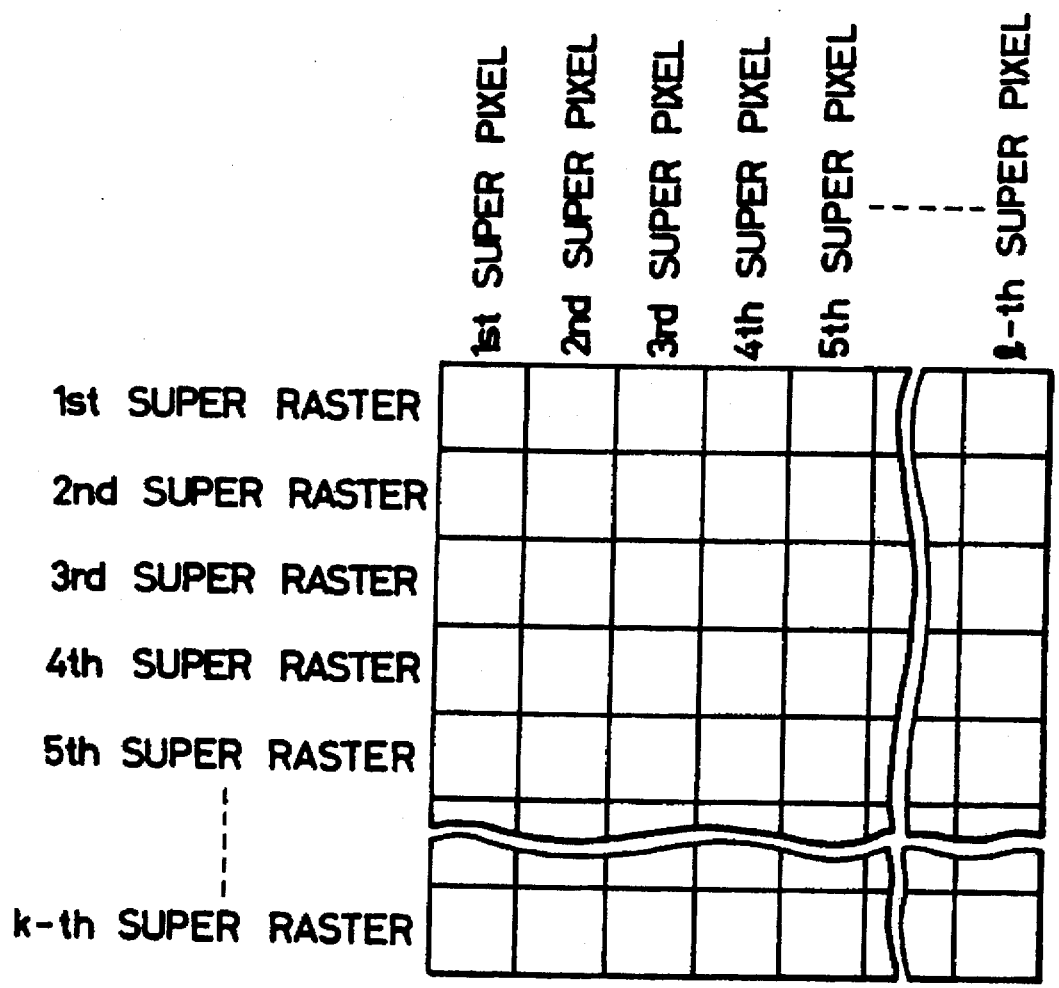
FIG. 3 is a diagram showing a state in which the original image was compressed on an area unit basis of 4×4 pixels of the original image.
Figure 4:
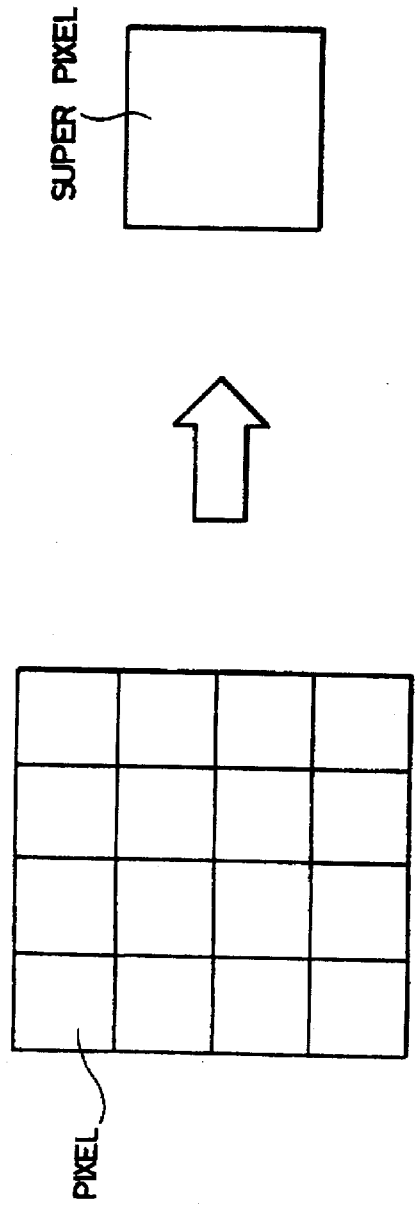
FIG. 4 is a diagram showing the corresponding relation between the area consisting of 4×4 pixels of the original image and the super pixel.

FIG. 2 is a diagram showing an original image as a constitution on a pixel unit basis. FIG. 3 is a diagram showing a state in which the original image is compressed on an area unit basis of 4×4 pixels (hereinafter, this pixel area is referred to as a super pixel) and the compressed data is constituted as a super pixel data on a super pixel unit basis. On the other hand, FIG. 4 is a diagram showing the corresponding relation between the image area consisting of 4×4 pixels of the original image and the super pixel.

In this embodiment, a highly fine image is held as a compressed image in a memory. The compressed data can be edited while displaying this compressed data on the monitor display, thereby suppressing the costs of the memory and display.

Figure 5:
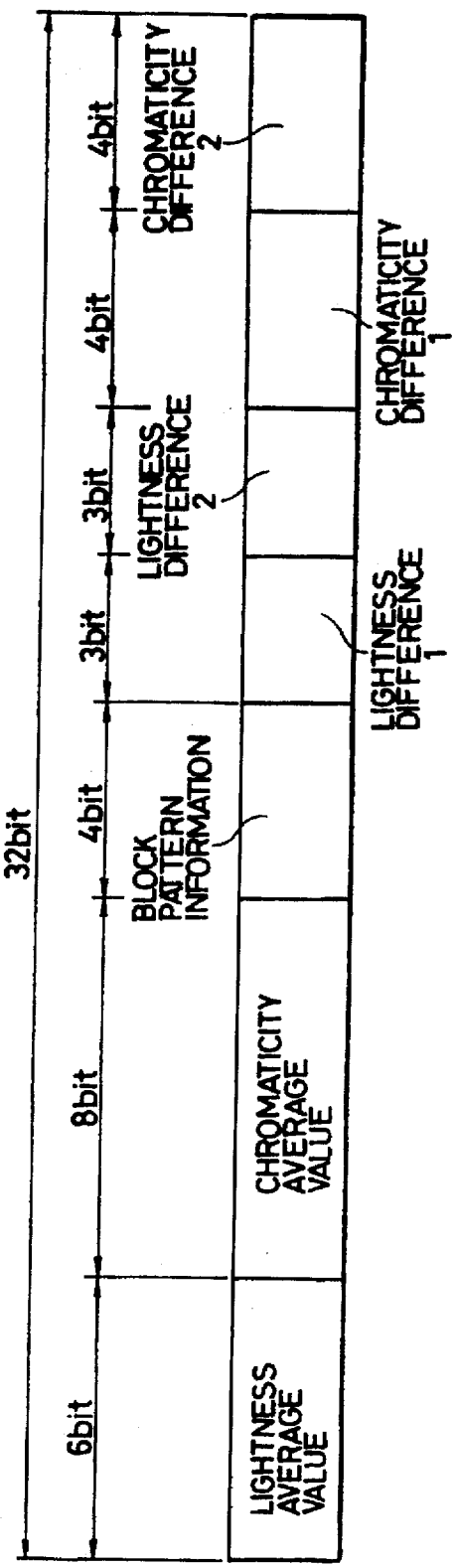
FIG. 5 is a diagram showing the compressed image data.

FIG. 5 shows an example of compressed data. A data length of the compressed data regarding each super pixel is equal to 32 bits. Namely, the lightness average value of the area (super pixel) consisting of 4×4 pixels of the original image is set to six bits. The chromaticity average value is set to eight bits. The block pattern data is set to four bits. Each of the lightness differences 1 and 2 is set to three bits. Each of the chromaticity differences 1 and 2 is set to four bits. Each pixel of the original image is the data having color data of total 18 bits in which each of the color data R, G, and B consists of six bits. Therefore, the total number of bits of 4×4 pixels is 288 (=18×16) bits, so that the image data can be compressed into 1/9 (=32/288).

Figure 6:
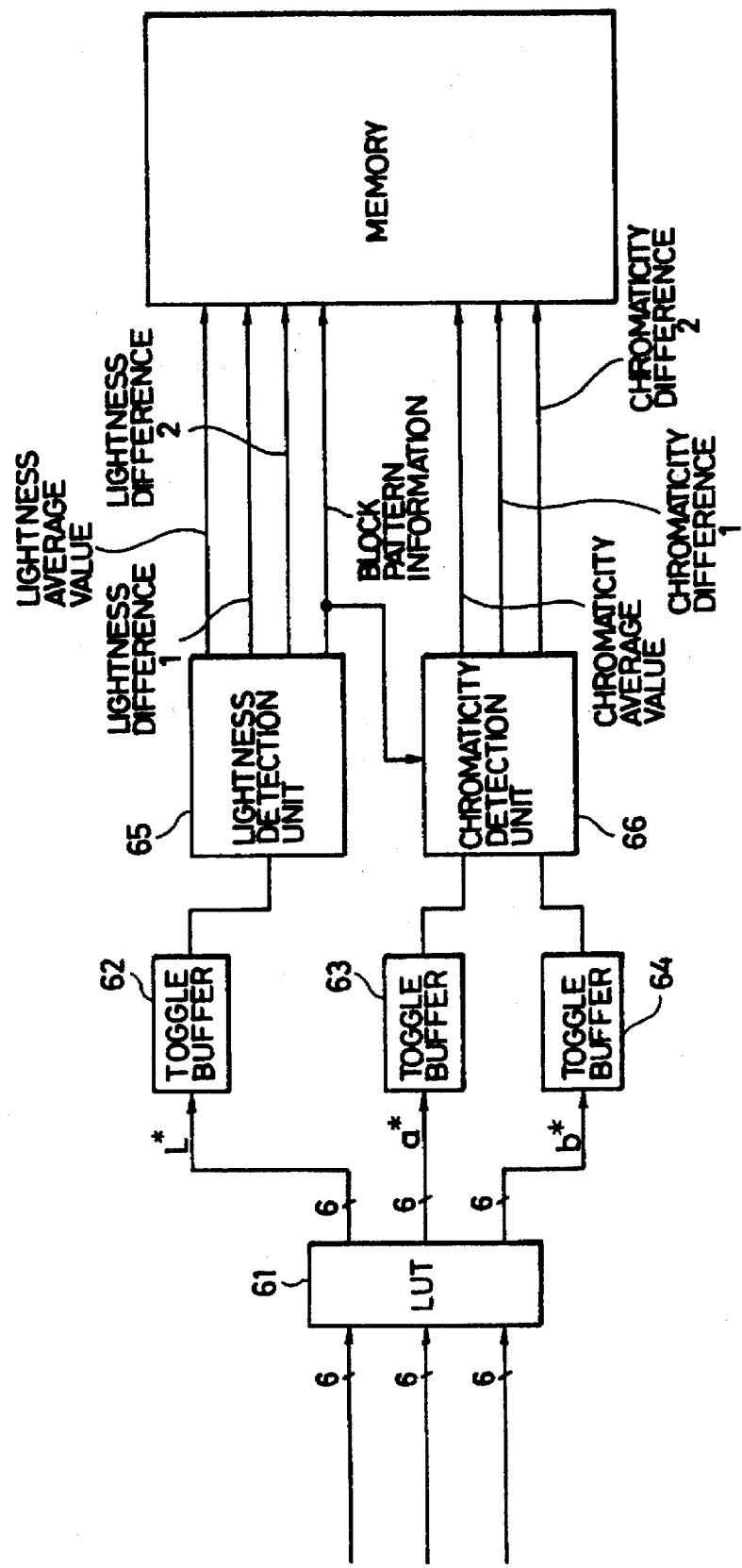
FIG. 6 is a block constitutional diagram of an image compressing section.

FIG. 6 is a block constitutional diagram of an image compressing section to make compressed data from the R, G, and B data of the original image each consisting of six bits and to store into a memory.

In the diagram, reference numeral 61 denotes a look-up table in which the number of input bits and the number of output bits are respectively set to 18 bits; 62 to 64 indicate toggle buffers in each of which four line buffers constitute two pairs. Numeral 65 denotes a lightness detection unit for obtaining the lightness average value from lightness data, for dividing 4×4 pixels into a pixel area having values larger than the lightness average value and into a pixel area having values smaller than the lightness average value (i.e., binarization), and for outputting the boundary data between these areas as block pattern data. The data indicative of the difference between the lightness average value in each pixel area divided by the boundary and the lightness average value in the image area of 4×4 pixels mentioned above is output as the lightness differences 1 and 2 from the detection unit 65. The lightness difference 1 is the difference data in the area having values larger than the average lightness value. The lightness difference 2 denotes the difference data in the area having values smaller than the average lightness value. On the other hand, the lightness data is calculated using L* which is expressed by uniform color spaces L* a* b*. The chromaticity data, which will be explained hereinafter, is calculated using a* b*. The R, G, and B data of the original image are converted into L* a* b* by use of the LUT 61.

A method of making the compressed data will be further described in detail hereinbelow.

Figure 7:
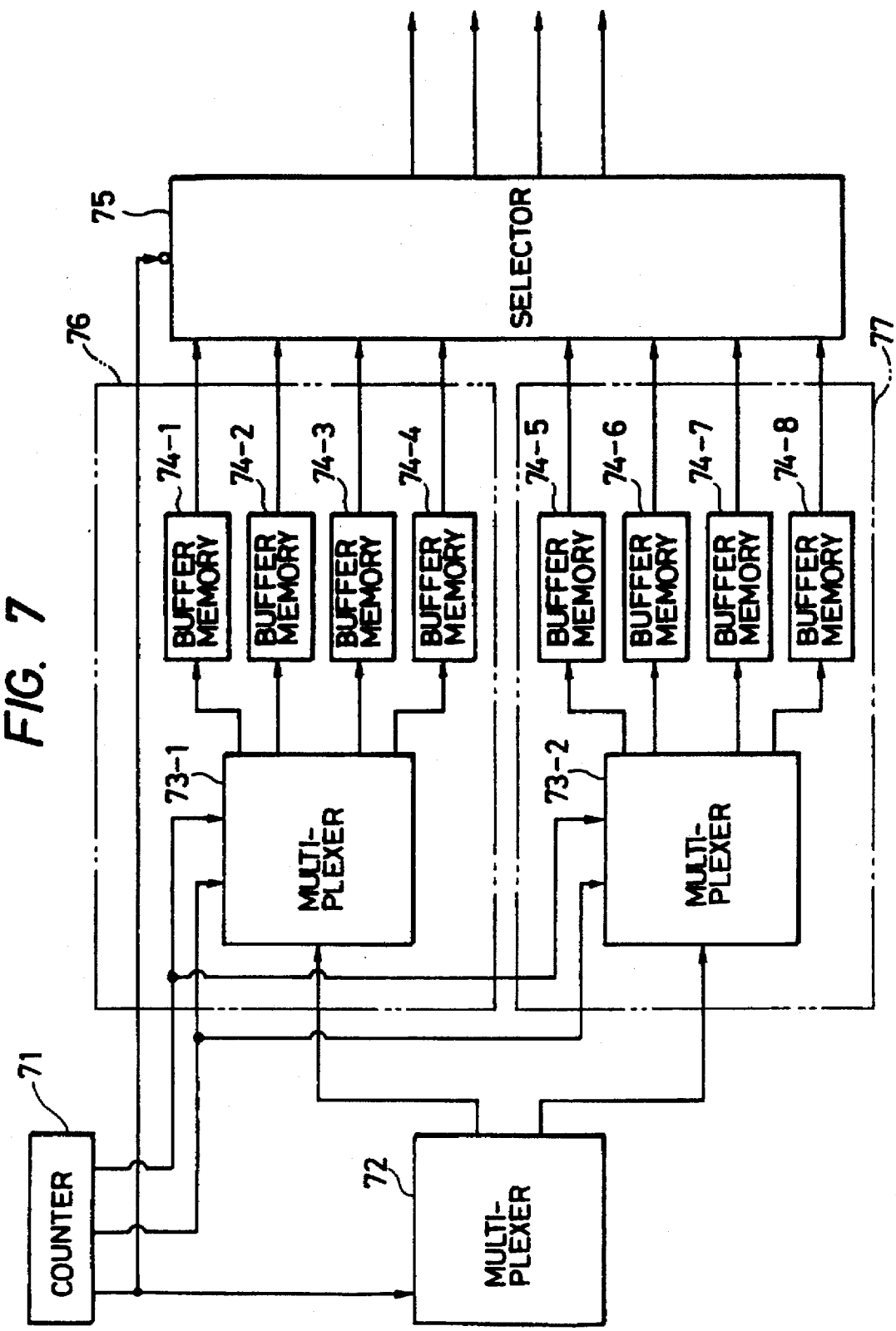
FIG. 7 is a diagram for explaining a constitution of a toggle buffer.

FIG. 7 is a diagram for explaining in detail constitutions of the toggle buffers 62 to 64.

In the diagram, reference numerals 74-1 to 74-4 and 74-5 to 74-8 denote buffer memories. These buffer memories constitute two pairs (in the following description, it is assumed that the buffer memories 74-1 to 74-4 are referred to as a buffer group 76 and the buffer memories 74-5 to 74-8 are referred to as buffer group 77).

The data inputs to the respective buffer memories are switched and used by multiplexers 73-1 and 73-2. Further, a multiplexer 72 switches whether the input image data is supplied to the buffer group 76 or buffer group 77. A selector 75 selects the outputs of the buffer group 76 or 77 and sends the data in a manner opposite to the case of the multiplexer 72. The outputs from the four buffer memories are output in parallel. A counter 71 is provided to control the multiplexers 72, 73-1, and 73-2 and the selector 75. By counting a raster sync signal, the multiplexer 72 and selector 75 are respectively switched every four rasters. Further, the output destination (buffer memory) of the multiplexer 73-1 (and multiplexer 73-2) is switched every raster.

Figure 8:
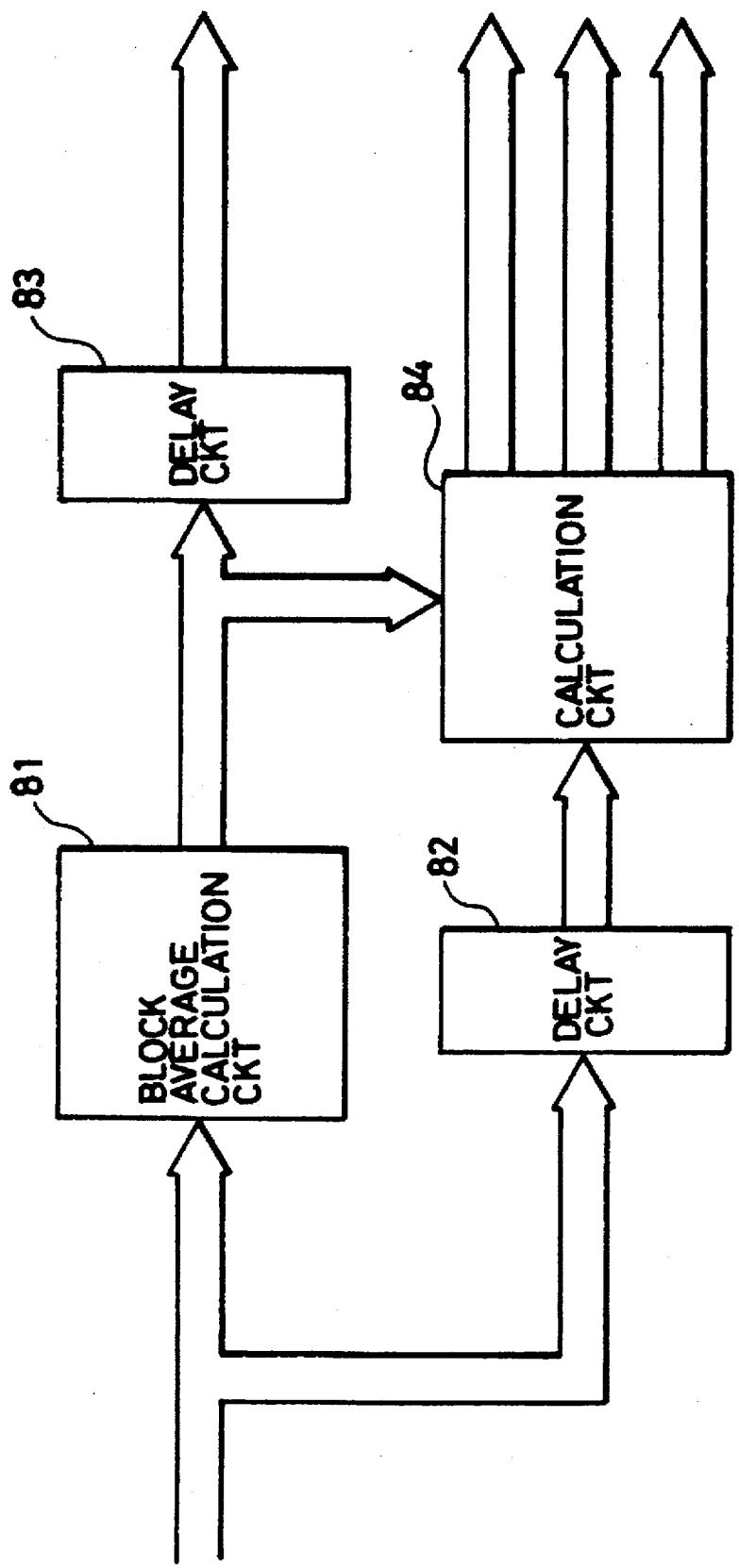
FIG. 8 is a diagram for explaining a detecting section in FIG. 6.

FIG. 8 is a diagram for explaining the detection unit 65 in FIG. 6 to output the lightness data from the data of four lines of L*. In the diagram, reference numeral 81 denotes a block average calculation circuit to calculate the average value of L* in the block, and 82 indicates a delay circuit to delay the data of each pixel in the block by only the time which is needed for the block average calculation circuit 81 to calculate the block average value. Numeral 84 denotes a calculation circuit to divide the area in the block into small areas on the basis of the L* data of each pixel in the block and the output from the block average calculation circuit 81 and to calculate the difference value between the area average value of each area and the block average value. Thus, the lightness average value, block pattern, and lightness average value, block pattern, and lightness differences 1 and 2 in FIG. 5 are obtained.

Figure 9:
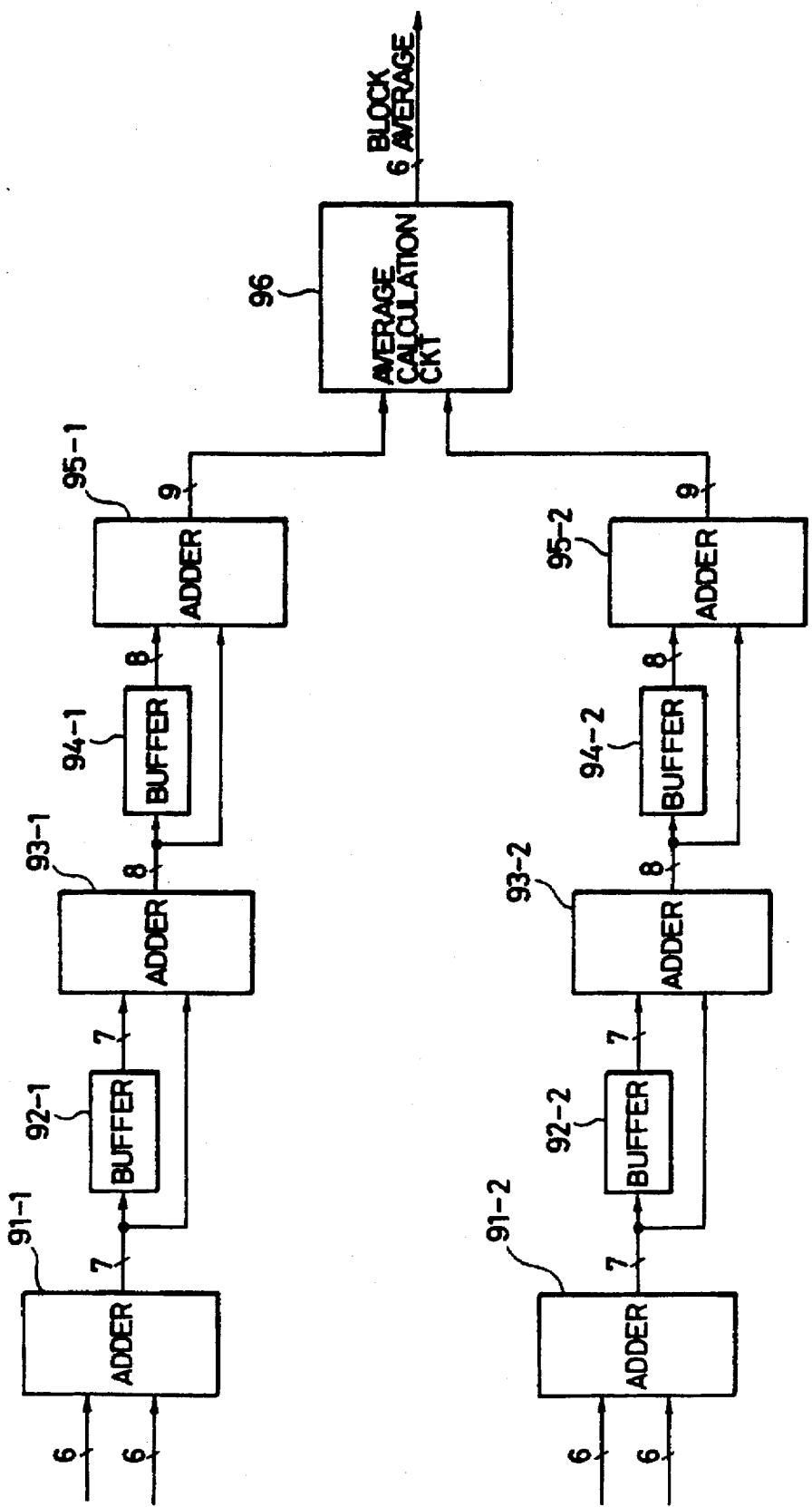
FIG. 9 is a diagram showing an example of a block average calculation circuit.

FIG. 9 is a block diagram showing an example of the block average calculation circuit 81.

In this circuit, the data of four rasters is respectively input in parallel, so that the data of sixteen (4×4) pixels is input.

Data of four pixels is input in parallel to the adders 91-1 and 91-2, respectively. Each of the adders adds these data every two pixels. Buffers 92-1 and 92-2 temporarily hold the outputs of the adders 91-1 and 91-2, respectively. Adders 93-1 and 93-2 add the two continuous outputs of the adders 91-1 and 91-2, respectively. Buffers 94-1 and 94-2 temporarily hold the outputs of the adders 93-1 and 93-2, respectively. Further, adders 95-1 and 95-2 add the two continuous outputs of the adders 93-1 and 93-2, respectively. Finally, the outputs of the adders 95-1 and 95-2 are added by an average calculation circuit 96. In this manner, the average value is calculated. The adders 93-1 and 93-2 operate at the period which is twice as long as the period of adders 91-1 and 91-2. The adders 95-1 and 95-2 and the average calculation circuit 96 operate at the period which is further twice as long as the period of the adders 93-1 and 93-2. Therefore, when the adders 91-1 and 91-2 perform the adding operations four times, the adders 93-1 and 93-2 execute the adding operation two times, and the adders 95-1 and 95-2 and the average calculation circuit 96 operate once. Each of the numerical values written over the buses to connect the adders with the buffers indicates the number of bits of the corresponding bus.

Figure 10:
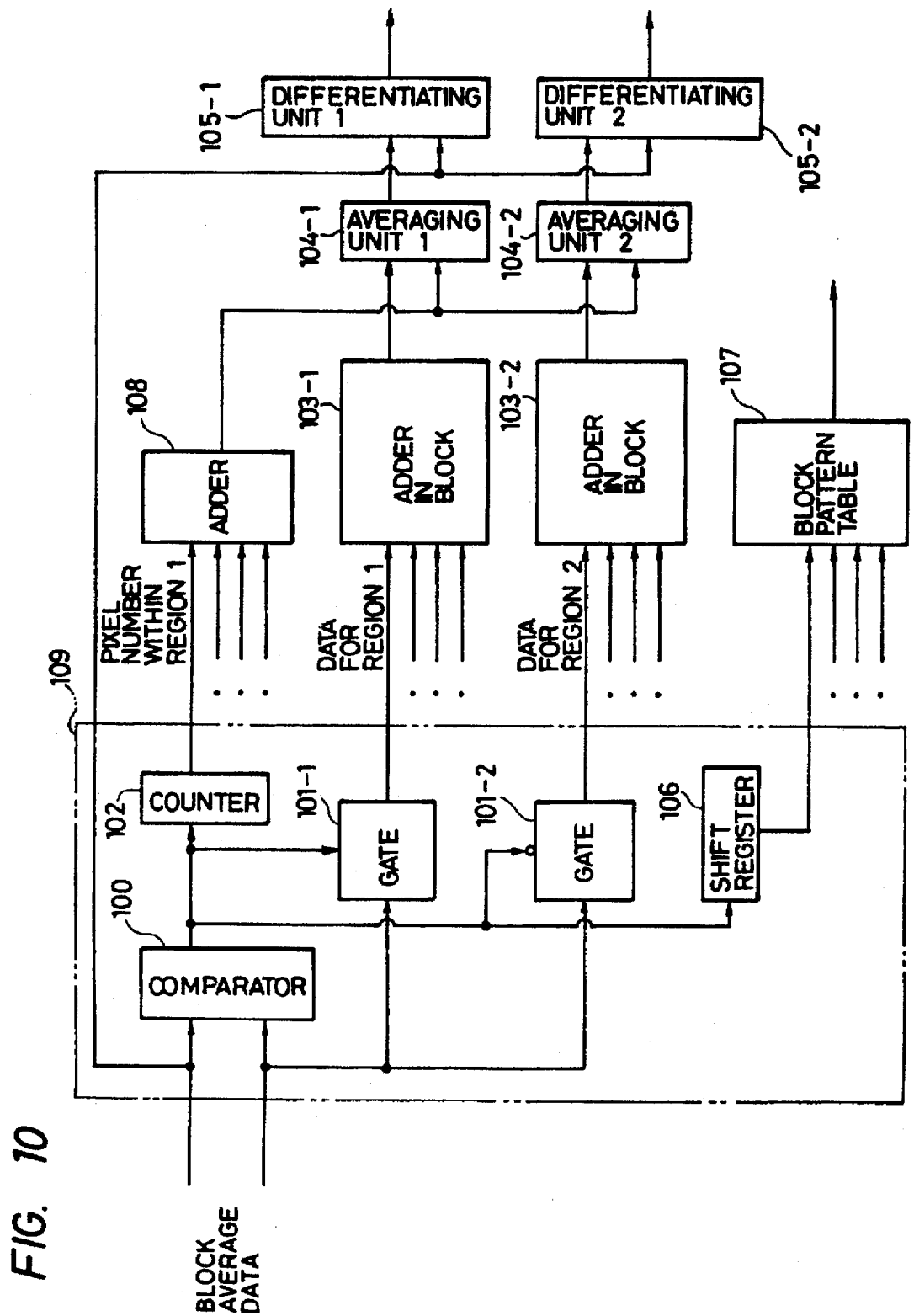
FIG. 10 is a detailed diagram of a circuit shown in FIG. 8.

FIG. 10 is a detailed divide of the calculation circuit 84 shown in FIG. 8 to divide the area and to calculate the area average value and the area difference value.

In the diagram, reference numeral 100 denotes a comparator which receives the data of each pixel in the block by the delay circuit 82 shown in FIG. 8 and the block average value from the block average calculation circuit 81, thereby discriminating whether each pixel exists in the area having values larger than the block average value or in the area having values which are equal to or smaller than the block average value. Since one block consists of four rasters and each raster is composed of four pixels, an explanation will be made on the assumption that each raster has one comparator 100. In other words, the comparator 100 in FIG. 10 and the counter and the like which are provided around the comparator perform the processing for one raster.

An output of each comparator 100 is generated as a switching signal of two gates 101-1 and 101-2, respectively. The gates 101-1 and 101-2 together receive the same pixel data. Namely, either one of the gates 101-1 and 101-2 directly outputs the input data by the output of the comparator 100 and the other gate outputs "0". A counter 102 counts the resultant output of the comparator 100, thereby counting how many pixels among four pixels are included in a region 1 (region having values larger than the block average value). A shift register 106 shifts the (binary) output of the comparator and outputs the shift states in parallel. Due to this, the block patterns in the regions 1 and a region 2 (region having values which are equal to or smaller than the block average value) in the block are expressed. A region 109 surrounded by a broken line in the diagram exists in each raster.

An adder 108 adds all of the pixels in the region 1 in each raster and outputs the pixel number in the block to averaging units 104-1 and 104-2. On the other hand, adders 103-1 and 103-2 add all of the values of the respective pixels in the region 1 in the block and all of the values of the respective pixels in the region 2 (having values which are equal to or smaller than the block average value) and output the result to the averaging units 104-1 and 104-2, respectively. The averaging units 104-1 and 104-2 receive the numbers of pixels in the regions 1 and 2 and the total values of these pixels and output the average values, respectively. The adders 103-1 and 103-2 can be constituted by circuits similar to the circuits shown in FIG. 9. The output of the circuit 96 is taken out without omitting the lower bits. Differentiating unit 105-1 and 105-2 output the differences between the average values of the regions 1 and 2 and the block average value, respectively. A block pattern table 107 receives patterns each consisting of four bits every raster and outputs a pattern of total sixteen bits as a pattern code. The averaging units 104-1 and 104-2, differentiating units 105-1 and 105-2, and block pattern table 107 can be easily realized by the LUT (look-up table) of the ROM.

It is also possible to constitute a circuit regarding the chromaticity in substantially the same manner. However, with regard to the dividing signal of the regions 1 and 2, the processes are performed using the data in the case of the lightness. The data is processed by the chromaticity data a* and b*. Although the data is independently handled with respect to a* and b*, the data of a* and b* are combined to thereby form the chromaticity data.

The compressed data obtained in this manner is compressed as described above and used as the display data. Due to this, when it is assumed that the original of, e.g., the A4 size was read at the pixel density of 16 pixels/mm, the data amount of 4752×3360 pixels can be reduced into the amount of 1188×840 super pixels. Thus, the compression rate of 1/9 is obtained.

By the foregoing compressing method, the array of pixels of the image data in FIG. 2 is converted into the array of super pixels in FIG. 3, so that the capacity is reduced. For example, the data of one page of the A4 size corresponds to about 4M (mega) bytes (≈1188×840×32 bits). This capacity can be easily realized by an IC memory. Each of the image memories 40, 41, and 44 shown in FIG. 1 has this memory capacity.

The compressed image (this image assumes image A) stored in the image memories 40 and 44 by the foregoing processes and the compressed image (this image assumes image B) stored in the image memory 41 are synthesized and displayed in the following manner. Namely, the images A and B are switched by the synthesizer 34 and displayed on the monitor display 37 in accordance with the data in the mask memory 42. At this time, the data length of each of the images A and B is set to 32 bits as previously explained in FIG. 5. However, in the case of displaying, only the lightness average value and the chromaticity average value are output. The other block patterns and the like are decoded when printing or the like.

When printing, the block pattern (in which the codes are stored) in the 32 bits of the data length is once decided into the binarization block of 4×4. The lightness value for the pixel of "1" is set to the value which is obtained by adding the lightness difference 1 to the lightness average value, and the chromaticity value is set to the value which is obtained by adding the chromaticity difference 1 to the chromaticity average value. Then, the decoding is performed.

On the other hand, for the pixel of "0", the lightness value is set to the value which is obtained by subtracting the lightness difference 2 from the lightness average value, and the chromaticity value is set to the value which is obtained by subtracting the chromaticity difference 2 from the chromaticity average value. Then, the decoding is performed.

These processes can be easily accomplished by use of the look-up table.

Description Of The Compression and Decoding Of The Mask Area

A format of the mask memory 42 for the foregoing compressed image data will now be explained.

The mask memory 42 is ordinarily constituted as a bit map memory for the pixel data before compression. Similarly to that the image data was compressed into the super pixels on a 4×4 (in general, M×N) pixel unit basis, the mask data is also compressed on a 4×4 (ordinarily, M×N) pixel unit basis (FIG. 11). The mask data differs from the image data with respect to the point that as shown in FIG. 12, the data (or bit) corresponding to each pixel is constituted by the value of "0" or "1".

In this embodiment, therefore, the mask pattern which is constituted by the matrix of 4×4 is coded and compressed.

In general, as shown in FIG. 14A, all of the bits corresponding to each pixel are set to "0" (assumes code 0) in the region (corresponding to the foregoing region 2) out of the mask region, and all of the bits are set to "1" (assumes code 127) in the region (corresponding to the region 1) in the mask region. In the diagram, the white portion indicates "0" and the black portion denotes "1".

Figures 1, 14B:
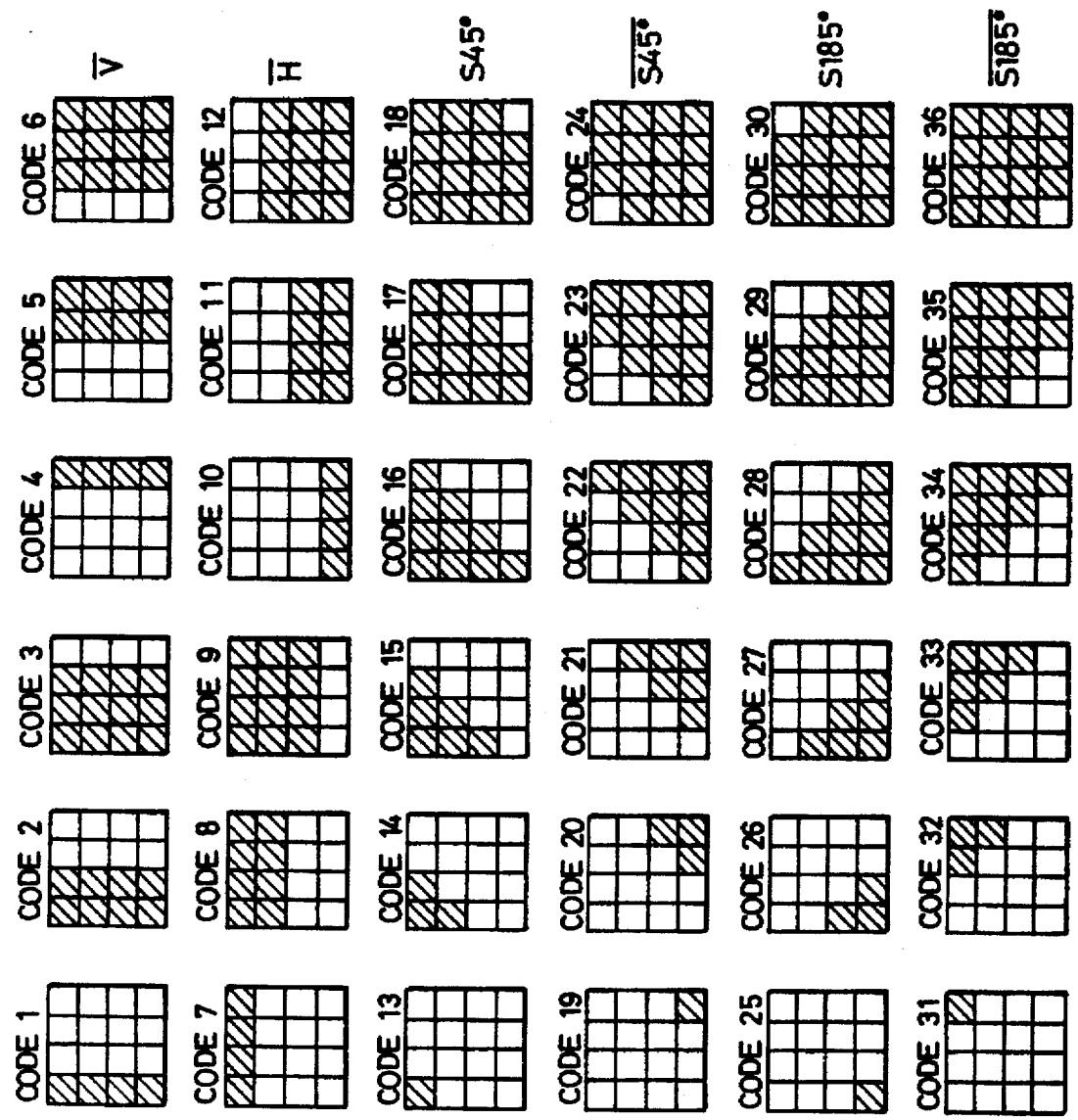
Figures 3, 14B:
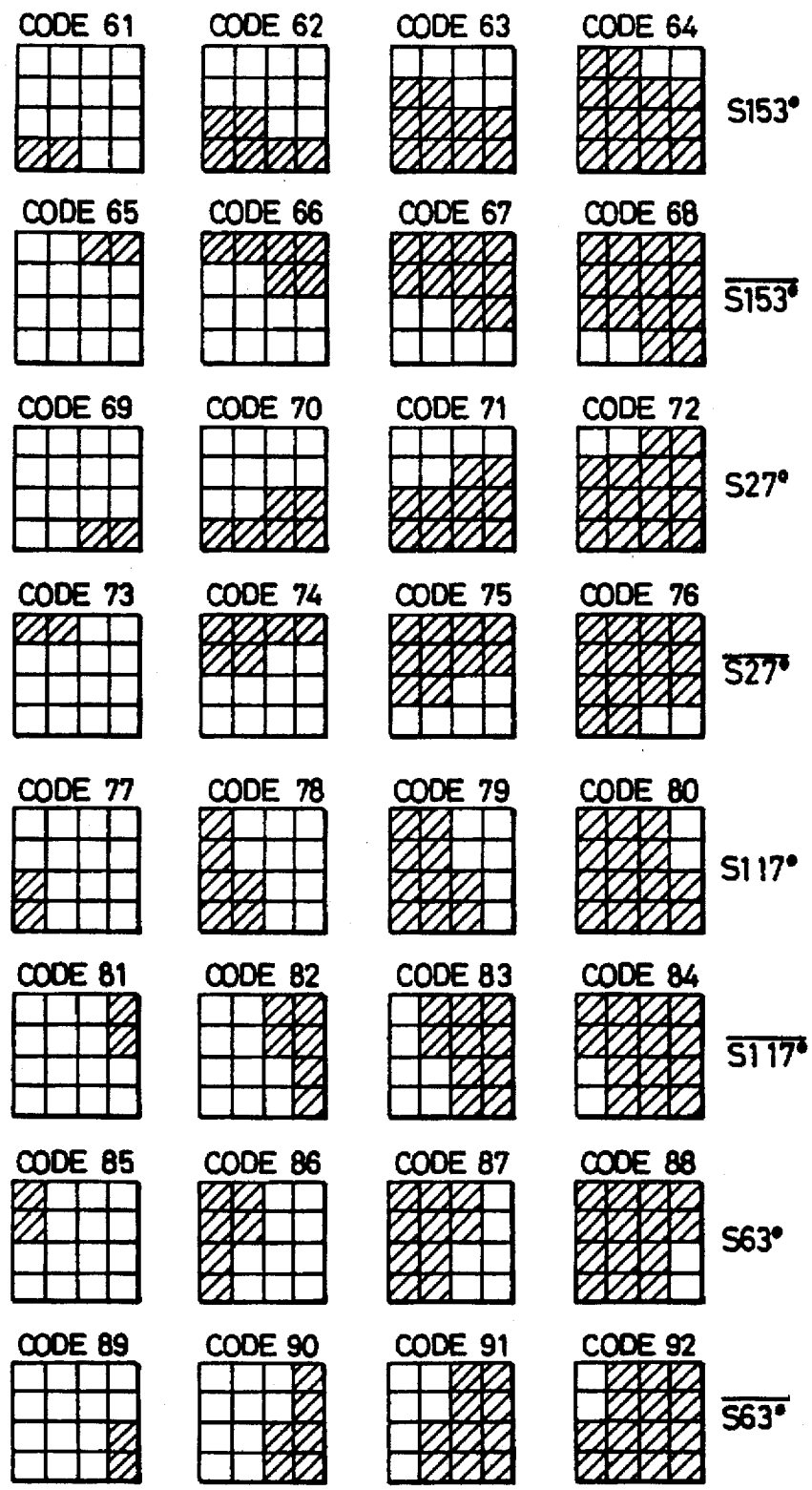

Therefore, a problem occurs in the edge portion of the mask pattern (in the case where the white and black portions mixed exist). In this embodiment, a mask pattern shown in FIG. 14B is provided. The numerical value written over each mask pattern in the diagram represents the code.

Codes 1 to 6 indicate vertical edges. Codes 1 to 3 and codes 4 to 6 show the state in which "0" and "1" are reversed (namely, the masking direction is opposite). Codes 7 to 12 indicate horizontal edges. Codes 13 to 36 represent edges at inclination angles of 45° and 135°.

Subsequently, codes 37 to 42 and codes 99 to 104 indicate edges at an inclination angle of 162° Codes 43 to 48 and codes 105 to 110 denote edges of 72°. Codes 49 to 54 and codes 93 to 98 indicate edges of 108°. Codes 55 to 60 and codes 111 to 116 represent edges of 18° Codes 61 to 68 show edges of 153°. Codes 69 to 76 show edges of 27°. Codes 77 to 84 represent edges of 117°. Codes 85 to 92 indicate edges of 63°.

Each angle value over which a bar is written in the diagram indicates the state in which "0" and "1" were reversed.

By coding the mask pattern in this manner, it will be understood that it is sufficient to provide seven bits (which can represent 128 kinds of codes) as shown in FIG. 13. Therefore, since the 4×4 (=16) bits are converted into seven bits, the compression rate of 7/16 is derived.

Figure 15:
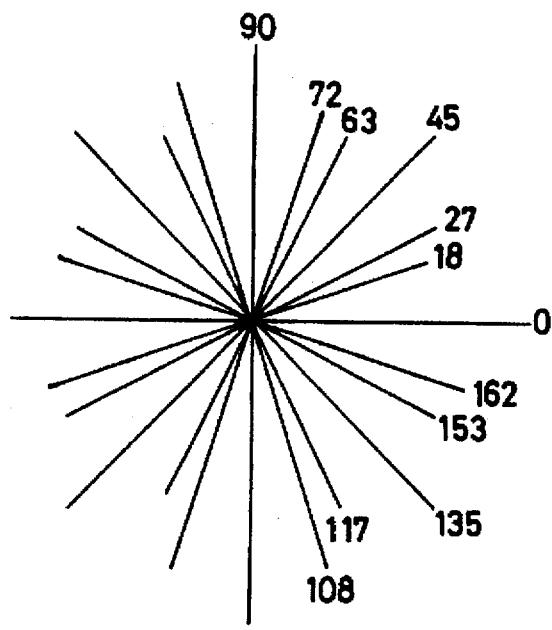
FIG. 15 is a diagram showing a state in which the angles of the edges of the mask patterns were plotted.

On the other hand, FIG. 15 is a diagram in which edge angles are plotted. The oblique edges which can occur in the mask pattern of 4×4 have such discrete values. However, by variably combining this mask pattern of 4×4 pixels, an arbitrary smooth curve can be obtained.

Figure 16:
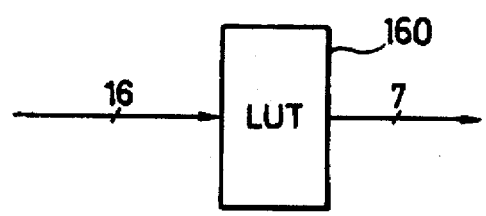
FIG. 16 is a diagram showing a look-up table to compress mask data.

Further, to produce mask codes shown in FIG. 14A and 14B from the mask pattern of 4×4 pixels, as shown in FIG. 16, they can be easily realized by use of a look-up table (ROM) 160 in which the number of input bits is sixteen and the number of output bits is seven.

Figure 17:
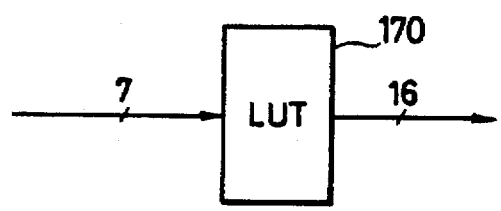
FIG. 17 is a diagram showing a look-up table to decode the compressed mask code.

On the other hand, in the case of decoding the code of seven bits into the mask pattern of 4×4 pixels, as shown in FIG. 17, it can be realized by a look-up table 170 in which the number of input bits is seven and the number of output bits is sixteen.

Therefore, when the mask pattern is stored into the mask memory 42, the code which was converted into the 7-bit code by the look-up table 160 shown in FIG. 16 is stored. When outputting to the synthesizer 34, the binary signal which was converted into the pattern of 4×4 pixels by the look-up table 170 is output. In any of the foregoing cases, the look-up tables shown in FIGS. 16 and 17 can be easily realized by using one or two ROMs.

Description Of The Relation Between The Image Data And The Mask Data

Figure 18:
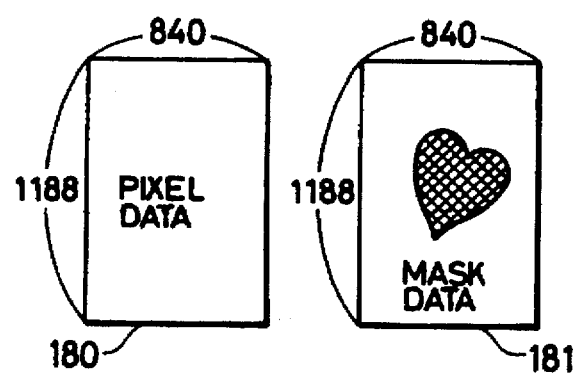
FIG. 18 is a diagram showing the relation between the image data and the mask data.

FIG. 18 shows the relation between compressed image data 180 of 32 bits and mask data 181 of seven bits.

As shown in the diagram, by storing the ♥-shaped mask pattern into the mask memory 42, only the region of the ♥ pattern in the image data 180 is extracted and displayed. The shape of the mask pattern is not limited to this example but can be set to a desired arbitrary shape and the similar processes can be also performed.

In the constitution of FIG. 1, the compressed image data of, e.g., image A is stored into the image memory 41. The compressed image data of image B is likewise stored into the image memory 40. The compressed mask pattern of a desired shape is stored into the mask memory 42. Due to this, the image which was extracted on the basis of the mask pattern for the image A is synthesized to the image B and the synthesized image is displayed. During this processes, none of the changing and correcting processes is performed for the images A and B. Therefore, the operator can extract, synthesize, and display a desired mask pattern many times. When the operator's desired image was finally formed, the image A (stored in the image memory 41) is then extracted in accordance with the content of the mask memory 42 and actually synthesizes to the image B (stored in the image memory 40). The synthesized image is printed and output. In a manner similar to the case where the synthesized image was displayed by the monitor display, the image synthesized by the synthesizer on the basis of the mask data can be also output to the printer.

As described above, by coding the mask pattern, the capacity of the mask memory can be reduced and an image can be masked by an arbitrary shape.

On the other hand, by compressing the image data, the capacity of the image memory can be also reduced and the system can be miniaturized.

The foregoing embodiment has been described with respect to the case where the image data and mask data were compressed on a 4×4 block unit basis. However, the invention is not limited to this case but can be also applied to other block constitutions such as e.g., 5×5, 4×2, and the like. Further, the total number (128) of mask patterns in this embodiment can be also set to, e.g., 64. In this case, the code length (the number of bits) indicative of the block pattern shown in FIG. 13 can be reduced to six bits; however, the roughness in the decoding contrarily increases.

As described above, according to the first embodiment of the invention, the capacity of the memory to store the mask data to cut out an image can be reduced, the low cost can be realized, and an increase in size can be prevented.

The first embodiment of the invention has been described above.

The second embodiment as a modified form of the invention will now be described.

Description of Synthesis and Display of Images

FIG. 19 is a block diagram of an image editing system in the second embodiment of the invention.

A host computer 1010 controls the whole system and has two buses BUSA and BUSB. A disc 1020 having a large capacity to store the image data is connected to the bus BUSA. In addition, memory units 1040 to 1060 to store images, a mask memory unit 1070 to store a mask shape, and an image processor unit (hereinafter, referred to as an IPU) 1030 as a processor only to process images are connected to both of the buses BUSA and BUSB. Further, this apparatus has a printer 1000 to output the synthesized image. It is desirable to use a printer of a high resolution such as, e.g., a laser beam printer or the like.

Figure 24:
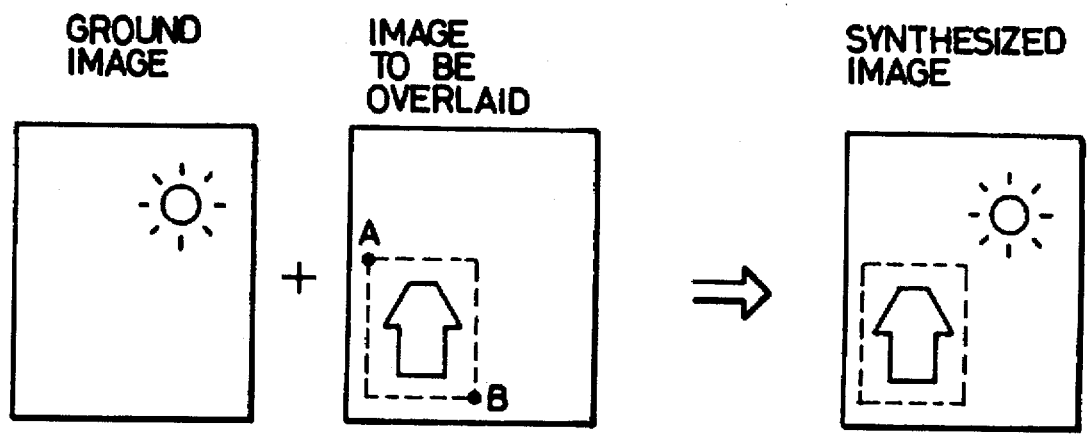
FIG. 24 is a diagram for explaining the synthesis of images.

First, the image which was read out of the disc 1020 is transferred to the memory unit 1050 by the control of the host computer 1010. For example, the image written in the memory unit 1050 is set to a ground image of the image to be synthesized as shown in FIG. 24. The image to be synthesized as shown in FIG. 24 is read out of the disc 1020 and written into the memory units 1060 and 1040 by the control of the host computer 1010.

Figure 25:
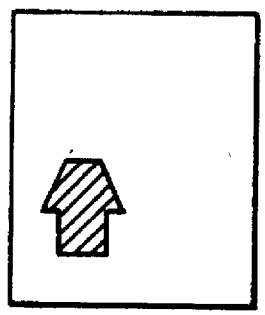
FIG. 25 is a diagram showing mask data.

Further, the mask data for the image to be synthesized is read out of the disc 1020 and transferred to the mask memory unit 1050 in a manner similar to the data to be mapped as shown in FIG. 25.

Figure 20A:
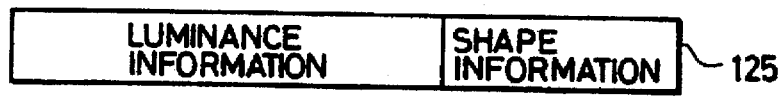
FIG. 20A is a diagram showing the compressed data of an image.
Figure 20B:
FIG. 20B is a diagram showing the compressed data of a mask.

The image data written in the memory units 1040 and 1050 is the compressed data for the adjacent areas each consisting of 4×4 pixels in the actual image. As shown in FIG. 20A, this data comprises: a bit indicative of the luminance information; and a bit indicative of the shape information representative of the shape when the image data of 4×4 pixels was binarized by a predetermined threshold value. Further, the mask data written in the mask memory unit 1070 is also the information indicative of the mask shape of 4×4 pixels per data so as to correspond to the compressed data of this image. This mask data is the compressed data for reduction of the memory capacity. As shown in FIG. 20B, this mask data comprises mask shape information of 4×4 pixels and a CRT mask flag of one bit.

The compressed ground image of the memory unit 1050, the compressed image to be synthesized of the memory unit 1060, and the compressed mask image of the mask memory unit 1070 are input to a synthesizer 1080.

Figure 22:
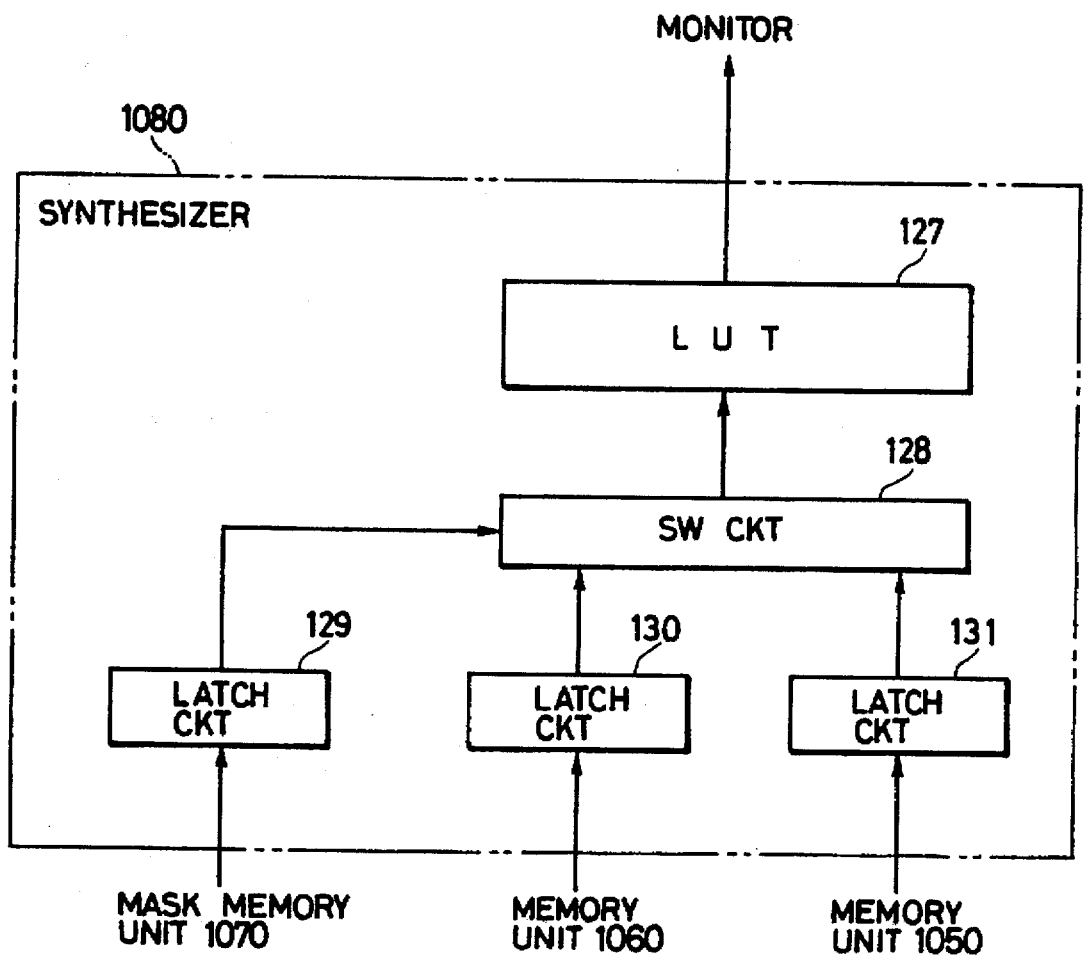
FIG. 22 is a block diagram of a synthesizer.

The synthesizer 1080 is constituted as shown in FIG. 22. Outputs of the memory units 1050 and 1060 are latched to latch circuits 131 and 130. An output of the mask memory unit 1070 is latched to a latch circuit 129. Only the luminance information shown in FIG. 20A in the compressed image data is latched into the latch circuits 131 and 130. The bit of the CRT mask flag shown in FIG. 20B in the compressed mask data is latched into the latch circuit 129. When an output of the latch circuit 129 is set to "1", an output of the latch circuit 130 is selected by a switching circuit 128. When it is set to "0", an output of the latch circuit 131 is selected by the switching circuit 128. A look-up table LUT 127 converts the luminance information which is output from the switching circuit 128 into the signal which is sent to a monitor display 1090. Since the signal which is input to the LUT 127 is inherently the luminance information of the area of 4×4 pixels, it is assumed that the LUT 127 converts the luminance information in accordance with the characteristics of the monitor display 1090.

Each of the memory units 1040 to 1060 and mask memory unit 1070 consists of a dual port RAM. Each port connected with the synthesizer 1080 always outputs the address data which is necessary for the monitor display 1090. The adjacent compressed data of 4×4 pixels is stored in the image memory units 1050 and 1060 and mask memory unit 1070. On the basis of the compressed data, to form one pixel on the monitor display 1090, the image data of a large screen can be displayed on the monitor display. For example, the dimensions of an original of the A4 size are 210 mm×297 mm. In the case where the resolution of the data which is stored into each memory unit is 12 pixels/mm, 2520×3564 pixels are needed. However, in the case of the compressed data in this embodiment, 4×4 pixels are compressed to from one data. Therefore, it is sufficient to display 630×891 data by the monitor display 1090. Accordingly, the image of the A4 size can be displayed on a single screen of the monitor of a high resolution.

Description of Synthesis of the Images of the Memory Units

An explanation has been made above with respect to the example in which the compressed image data of two frames is stored in the memory units 1050 and 1060 and synthesized on the CRT. However, the invention is not limited to this example. The processes in which the compressed images of two frames are actually synthesized to form the data of one frame will now be described hereinbelow.

The image processor unit 1030 is connected to the buses BUSA and BUSB. The images which are read out of the image memory units 1040 to 1060 and mask memory unit 1070 are sequentially input to the IPU 1030 through the bus BUSB. The IPU 1030 is constituted as shown in FIG. 23. The IPU 1030 synthesizes the images of two frames on the basis of the compressed mask data and writes and synthesizes the image in the memory unit 1060 to the ground image in the memory unit 1050 through the bus BUSA on the basis of the mask data stored in the mask memory unit 1070.

The buses BUSA and BUSB through which the image data is input into and output from the memory units 1040 to 1060 mask memory unit 1070 and IPU 1030 can be freely selected and this selection is ordinarily controlled by the host computer 1010. However, in the case of performing the pipeline processes in the IPU 1030, one of the buses is used only to read out from the memories and the other is used only to write into the memories. However, in the case where such pipeline processes are not performed by the IPU 1030, it is sufficient to use a single bus and the number of buses is not limited.

FIG. 23 shows a block diagram of the IPU 1030. The operation of the IPU 1030 will now be described. The compressed image data which was read out every line from the memory units 1040 and 1060 and mask memory unit 1070 is stored into line buffers 110, 111, and 112, respectively. In this case, an address generator 122 counts up by a timing clock which is generated from a clock generator 121 and indicates an address in the memory. On the other hand a control unit 123 is driven by a ripple carry signal of one-line end signal which is generated from the address generator 122. The control unit 123 generates upper addresses of the relevant memory units 1040 and 1060 and mask memory unit 1070 and outputs to each memory unit through a buffer 120. The upper addresses which are generated from the control unit 123 are decoded by a decoder 124 and either one of the line buffers 110, 111, and 112 corresponding to the relevant memory unit is set into the writing mode.

Next, the address generator 122 again generates addresses to sequentially access one line which was read onto the line buffer. Outputs of the line buffers 110, 111, and 112 are simultaneously decoded by a mask decoder 113 and decoders 114 and 115, respectively. The compressed mask data is not written when it is determined by a decision unit 116 that the bit of the CRT mask flag shown in FIG. 20B is set to "0". Namely, an output buffer 119 of data is held open and no data is written into the memory unit 1050. On the contrary, when the CRT mask flag bit is set to "1" and all of the 4×4 pixels are extracted on the basis of the mask shape information of a mask compressed data 126, the image data to be synthesized which is input to the line buffer 111 is output to the bus BUSA through a selector 118 and through the buffer 119 and written into the memory unit 1050. This decision is similarly performed by the decision unit 116.

Next, in the case where the image to be synthesized, namely, the mask shape which is extracted from the memory unit 1040 and synthesized to the image data in the memory unit 1050 is as shown in FIG. 21C, when a part (region surrounded by a circle in FIG. 21C) of the mask shape is magnified, it becomes stairway shaped every corresponding one pixel on the CRT as shown in FIG. 21B. This shape is determined by the bits of the CRT mask of the mask compressed data 126. However, one pixel data on the CRT is the luminance information of the data of 4×4 pixels as mentioned above. On the other hand, the mask data also has the mask shape information of 4×4 pixels. This state is shown in FIG. 21A. The hatched portion corresponds to the hatched portion in FIG. 21B. When at least a part of the mask overlaps the block of 4×4 pixels, the CRT mask bit is set to "1" as mentioned above and this portion is set to the cut-out mask on the CRT.

On the other hand, if it is determined by the decision unit 116 that the CRT mask bit in the mask compressed data 126 is set to "1" and all of the 4×4 pixels are not the mask pattern due to the mask shape information, the decision unit 116 controls the selector 118 so as to select an output of an image synthesizer 117. The synthesized image is read out of the output buffer 119 and written into the memory unit 1050. The compressed image data in the memory unit 1040 in this manner is together read out one line by one and is synthesized. This synthesizing process is performed with respect to the data of all lines. In this manner, the synthesis of the whole image on the display screen is finished.

Description Of The Image Synthesizer

Figure 26:
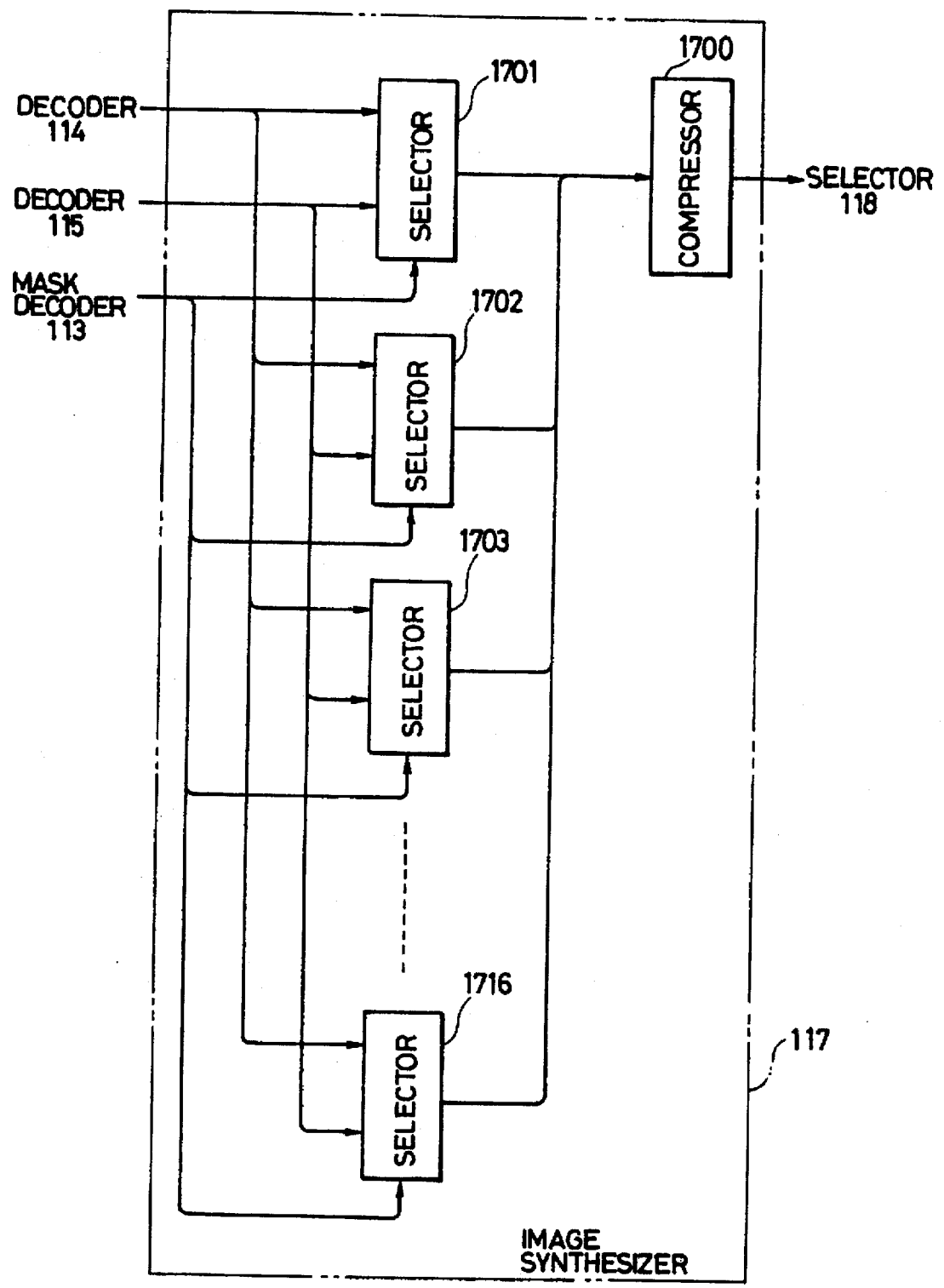
FIG. 26 is a diagram showing an image synthesizer.

FIG. 26 is a block diagram showing a further detailed constitution of the image synthesizer 117. Namely, the decoders 114 and 115 expand the compressed data into the deep data of a few bits of total 16 (=4×4) pixels, respectively. The expanded data is input to sixteen data inputs of selectors 1701 to 1716 every pixel data corresponding to the same positions of 4×4 blocks.

The mask decoder 113 also expands the mask of 4×4 pixels into sixteen one-bit data on the basis of the mask shape information of the mask compressed data 126. The sixteen expanded mask data are input as data selecting control signals of the selectors 1701 to 1716 to which the pixel data at the corresponding positions is input. In this manner, the synthesizing processes are executed in the selectors 1701 to 1716 on the basis of the mask information with regard to each of the 4×4 pixel data. The sixteen deep pixel data synthesized on a pixel unit basis are compressed into one compressed data by a compressor 1700, so that the compressed image data composed of the luminance information and shape information shown in FIG. 20A is formed and output to the memory unit 1050.

After the images in the memories were synthesized, the synthesized image is output to the printer 1000 described before and the image of the high resolution can be derived. On the other hand, the synthesized image stored in the memory unit 1050 can be also registered in the disc 1020.

All of the image synthesizing processes mentioned above are performed by cutting the buses at the boundary indicated by a broken line in FIG. 19. Namely, the use of the buses is inhibited in the region other than the right portion of the boundary. After completion of all of the processes, the IPU 1030 generates an use permission interruption to the host computer 1010. When the host computer 1010 enters the state in which it must use the buses, it generates an interruption to the IPU 1030 and can interrupt the synthesizing process which is executed in the IPU 1030.

In this embodiment, the line buffers 110, 111, 112 are provided in the IPU 1030 and the compressed ground data, compressed synthesized data, and compressed mask data are read and synthesized every line. However, the reading and synthesizing processes can be also sequentially performed every other pixel. On the other hand, the mask data is previously read and as the result of this, if the CRT mask bit of the mask compressed data 126 is set to "0", the writing process is not performed. Therefore, the compressed ground data and the data to be synthesized are not read. If the CRT mask bit is set to "1", when all of the 4×4 pixels are the mask image due to the shape information, only the data to be synthesized is read and written into the memory unit 1050. Only when the CRT mask bit is set to "1" and all of the 4×4 pixels are not the mask image, both of the compressed ground data and the data to be synthesized are read and synthesized and thereafter, the synthesized image is written into the memory unit 1050. In this way, the number of accessing times to the memory in the synthesizing processes can be reduced.

As described above, according to the second embodiment of the invention, images can be synthesized by a simple constitution. Also, even when each image is larger than the size of monitor display, the editing state of the whole image on the display screen can be known and after the image to be synthesized was decided, the image synthesizing process can be actually executed. Therefore, this invention is every useful. Further, when an image is displayed and the operator decides that this image is proper and then the operator synthesizes the image in the actual memory, in addition to the memory to store the image, a video RAM is generally needed. However, as in the second embodiment, by switching the luminance information in the memories into which the images have been stored in accordance with the mask information and by using the readout signal as the display signal, the image process is performed by the same memory, so that the memories can be efficiently used.

Further, by providing the luminance information every pixel, as in the second embodiment, by developing each image in each memory unit by using the shape information of 4×4 pixels and the luminance information of the whole matrix as the image data, the memories can be also efficiently used.

Further, by setting the mask data into various shapes, the synthesized image of a partial image which is desired by the operator can be displayed at a high speed.

The embodiment has been described with respect to the example in which each image is read out of the disc 1020 and synthesized. However, the images which were read by a reading device such as an image scanner or the like can be also synthesized. At this time, as the shape of mask, by setting a partial image to be masked by inputting a closed interval by use of a coordinate input apparatus such as, e.g., a digitizer or the like, the operational easiness will be improved.

Although the embodiment has been described with regard to the case where an image is displayed on a 4×4 pixel unit basis, the invention is not limited to this unit. An image can be also displayed on a unit basis of the number of pixels smaller or larger than 4×4 pixels.

According to the foregoing second embodiment of the invention, images can be easily synthesized and displayed by a simple constitution. Also, even when each image is larger than the size of monitor display, the whole image can be recognized on the display screen and the images can be actually synthesized while observing the whole image. Thus, this embodiment is extremely useful.

On the other hand, since the mask data is individually stored into an output apparatus having a low resolution, e.g., display apparatus and into an output apparatus having a high resolution, e.g., a printer. Thus, the image extraction control can be performed in accordance with the output apparatus.

Further, since the image data and mask data are respectively stored every same number of units, the image extraction control can be more easily executed.

The embodiment has been described with respect to the example in which the display apparatus has been used as the apparatus having a low resolution. However, in the case of the display apparatus having a high resolution, the image data and mask shape information are developed.

Similarly, in the case of the printer having a low resolution, only the luminance information can be used as the image data and only the control data can be used as the mask data.

The present invention is not limited to the foregoing embodiments but many modifications and variations are possible within the spirit and scope of the appended claims of the invention.

What is claimed is:

1. An image processing apparatus comprising:

image memory means for storing compressed and coded image data representing an image, the compressed and coded image data comprising first data representing the image with a low resolution and second data representing the image with a high resolution;

generating means for generating image data of the low resolution and image data of the high resolution, by decoding the compressed and coded image data stored in said image memory means;

providing means for providing area data representing a partial area of the image, the area data comprising first area data representing the partial area with the low resolution and second area data representing the partial area with the high resolution;

first processing means for processing the image data of the low resolution generated by said generating means in accordance with the first area data provided by said providing means and displaying an image on the basis of the processed image data of the low resolution; and second processing means for processing the image data of the high resolution generated by said generating means in accordance with the second area data provided by said providing means and printing an image on the basis of the processed image data of the high resolution.

2. An image processing apparatus according to claim 1, wherein said first processing means comprises display means for displaying an image on the basis of the processed image data of the low resolution.

3. An image processing apparatus according to claim 1, wherein said second processing means comprises printing means for printing an image on the basis of the processed image data of the high resolution.

4. An image processing apparatus according to claim 1, wherein said first processing means extracts image data corresponding to the partial area from the image data of the low resolution generated by said generating means in accordance with the first area data.

5. An image processing apparatus according to claim 1, wherein said second processing means extracts image data corresponding to the partial area from the image data of the high resolution generated by said generating means in accordance with the second area data.

6. An image processing apparatus according to claim 1, wherein said providing means comprises area memory means for storing the area data and provides the area data stored in said image memory means.

7. An image processing apparatus according to claim 6, wherein said area memory means stores compressed and coded area data and said providing means provides the area data on the basis of the compressed and coded area data stored in said area memory means.

8. An image processing apparatus according to claim 1, wherein the image data of the low resolution is representative data of pixels each of unit areas consisting of n×m pixels.

9. An image processing method comprising:

a storing step of storing compressed and coded image data representing an image, the compressed and coded image data comprising first data representing the image with a low resolution and second data representing the image with a high resolution;

a generating step of generating image data of the low resolution and image data of the high resolution, by decoding the compressed and coded image data stored in said storing step;

a providing step of providing area data representing a partial area of the image, the area data comprising first area data representing the partial area with the low resolution and second area data representing the partial area with the high resolution;

a first processing step of processing the image data of the low resolution generated at said generating step in accordance with the first area data provided at said providing step and displaying an image on the basis of the processed image data of the low resolution; and a second processing step of processing the image data of the high resolution generated at said generating step in accordance with the second area data provided at said providing step and printing an image on the basis of the processed image data of the high resolution.

10. An image processing method according to claim 9, wherein said first processing step comprises a display step of displaying an image on the basis of the processed image data of the low resolution.

11. An image processing method according to claim 9, wherein said second processing step comprises a printing step of printing an image on the basis of the processed image data of the high resolution.

12. An image processing method according to claim 9, wherein, in said first processing step, image data corresponding to the partial area is extracted from the image data of the low resolution generated at said generating step in accordance with the first area data.

13. An image processing method according to claim 9, wherein, in said second processing step, image data corresponding to the partial area is extracted from the image data of the high resolution generated at said generating step in accordance with the second area data.

14. An image processing method according to claim 9, wherein the image data of the low resolution is representative data of pixels each of unit areas consisting of n×m pixels.

15. An image processing method according to claim 9, further comprising a second storing step of storing the area data, wherein, in said providing step, the area data stored in said second storing step is provided.

16. An image processing method according to claim 15, wherein, in said second storing step, compressed and coded area data is stored and, in said providing step, the area data is provided on the basis of the compressed and coded area data stored in said second storing step.

* * * * *

UNITED STATES PATENT AND TRADEMARK OFFICE
CERTIFICATE OF CORRECTION

PATENT NO. : 5,680,486

DATED : October 21, 1997

INVENTORS : YOSHINOBU MITA ET AL.

It is certified that error appears in the above-identified patent and that said Letters Patent is hereby corrected as shown below:

ON TITLE PAGE

[57] Abstract line 15,

"data of" should read --data and displays an image on the basis of the processed image data of --.

COLUMN 1 line 37, "patent" should read --Patent--;
line 38, "application" should read --Application--;
line 39, "patent application" should read --Patent Application--; and
line 61, "increase" should read --becomes--.

COLUMN 3 line 34, "circuit" should read --circuit 84--.

COLUMN 4 lines 12-13, "in ¶ FIG. 1" should read --in FIG. 1 --.

COLUMN 5 line 48, "as a" should read --as--.

UNITED STATES PATENT AND TRADEMARK OFFICE
CERTIFICATE OF CORRECTION

PATENT NO. : 5,680,486

DATED : October 21, 1997

INVENTORS : YOSHINOBU MITA ET AL.

It is certified that error appears in the above-identified patent and that said Letters Patent is hereby corrected as shown below:

COLUMN 8 line 15, "Of The" should read --of the-- and "Of" (second occurrence) should read --of--; and line 16, "The" should read --the--.

COLUMN 9 line 22, "Of The" should read --of the-- and "The" (second occurrence) should read --the--;

line 23, "And The" should read --and the--; and line 40, "processes," should read --process,--.

COLUMN 10 line 12, "of" (first occurrence) should read --of the--.

UNITED STATES PATENT AND TRADEMARK OFFICE
CERTIFICATE OF CORRECTION

PATENT NO. : 5,680,486

DATED : October 21, 1997

INVENTORS : YOSHINOBU MITA ET AL.

It is certified that error appears in the above-identified patent and that said Letters Patent is hereby corrected as shown below:

COLUMN 12 line 57,   "Of The" should read --of the--.

COLUMN 13 line 23,   "an use" should read --a use--; and
  line 54,   "every" should read --very--.

Signed and Sealed this

Twenty-ninth Day of September, 1998

Attest:

BRUCE LEHMAN

*Attesting Officer*     *Commissioner of Patents and Trademarks*